US012737272B2

(12) United States Patent
Isaac

(10) Patent No.: US 12,737,272 B2
(45) Date of Patent: Sep. 15, 2026

(54) APPLICATION EXECUTION ALLOCATION USING MACHINE LEARNING

(71) Applicant: NVIDIA Corporation, Santa Clara, CA (US)

(72) Inventor: Ronald N. Isaac, San Ramon, CA (US)

(73) Assignee: NVIDIA Corporation, Santa Clara, CA (US)

( * ) Notice: Subject to any disclaimer, the term of this patent is extended or adjusted under 35 U.S.C. 154(b) by 590 days.

(21) Appl. No.: 18/094,028

(22) Filed: Jan. 6, 2023

(65) Prior Publication Data

US 2024/0232039 A1 Jul. 11, 2024

(51) Int. Cl.
*G06F 11/34* (2006.01)
*G06N 20/00* (2019.01)

(52) U.S. Cl.
CPC ......... *G06F 11/3409* (2013.01); *G06N 20/00* (2019.01)

(58) Field of Classification Search
CPC ............................ G06N 20/00; G06F 11/3409
USPC .......................................................... 702/182
See application file for complete search history.

(56) References Cited

U.S. PATENT DOCUMENTS 11,138,025 B2 * 10/2021 Hahn ........................ G06F 8/36
11,503,062 B2 * 11/2022 Vlahovic .............. H04L 63/102

FOREIGN PATENT DOCUMENTS

CN 110659176 A * 1/2020

* cited by examiner

*Primary Examiner* — John H Le
(74) *Attorney, Agent, or Firm* — Lowenstein Sandler LLP

(57) ABSTRACT

Apparatuses, systems, and techniques for assigning execution of applications to various processing units using machine learning are disclosed herein. Usage data for an application to be executed using a computing system including an integrated processing unit and a discrete processing unit is identified. At least a portion of operations of the application to be executed using the integrated processing unit or the discrete processing unit based on the usage data and in view of at least one of one or more system performance metrics or one or more user experience metrics associated with executing the application using the integrated processing unit and the discrete processing unit.

20 Claims, 15 Drawing Sheets

400

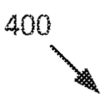

Identify usage data associated with an application that is to be executed using a computing system 410

Provide the usage data as input to a machine learning trained to predict values for system performance metrics and/or user experience metrics associated with executing the application using an integrated processing unit and a discrete processing unit of the computing system 412

Extract, from one or more outputs of the machine learning model:
- a first performance metric value and/or a first user experience metric value associated with executing operations of the application using the integrated processing unit, and
- a second performance metric value and/or a second user experience metric value associated with executing operations of the application using the discrete processing unit of the computing system 414

Cause at least a portion of the operations of the application to be executed via the integrated processing unit or the discrete processing unit in view of the first performance metric value and/or the first user experience metric value and/or the second performance metric value and/or the second user experience metric value 416

FIG. 4

700
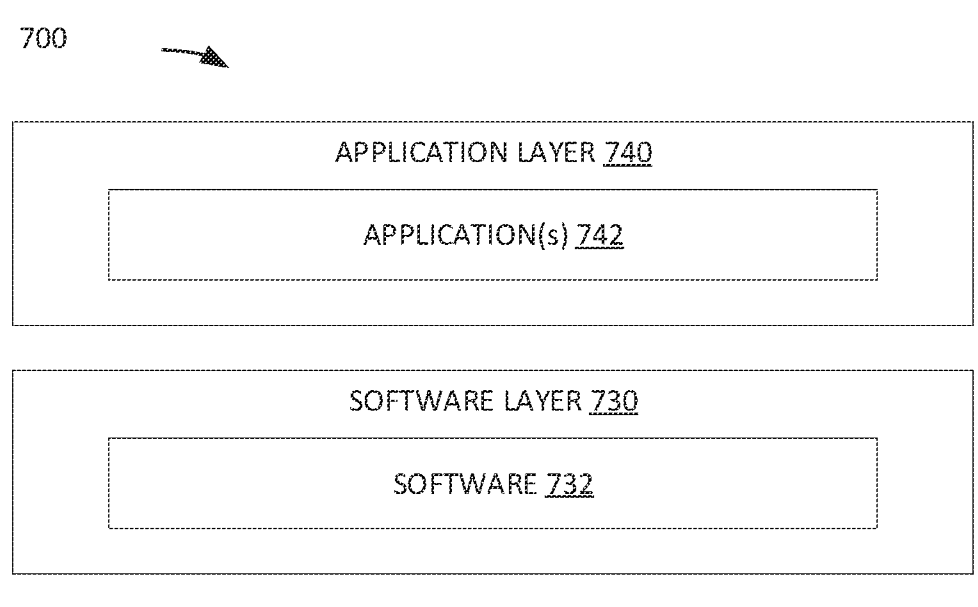
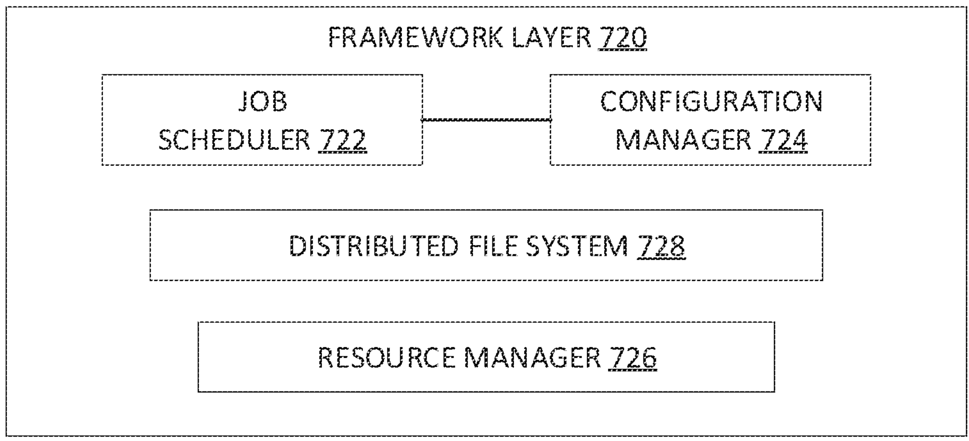
FRAMEWORK LAYER 720
JOB SCHEDULER 722
CONFIGURATION MANAGER 724
DISTRIBUTED FILE SYSTEM 728
RESOURCE MANAGER 726
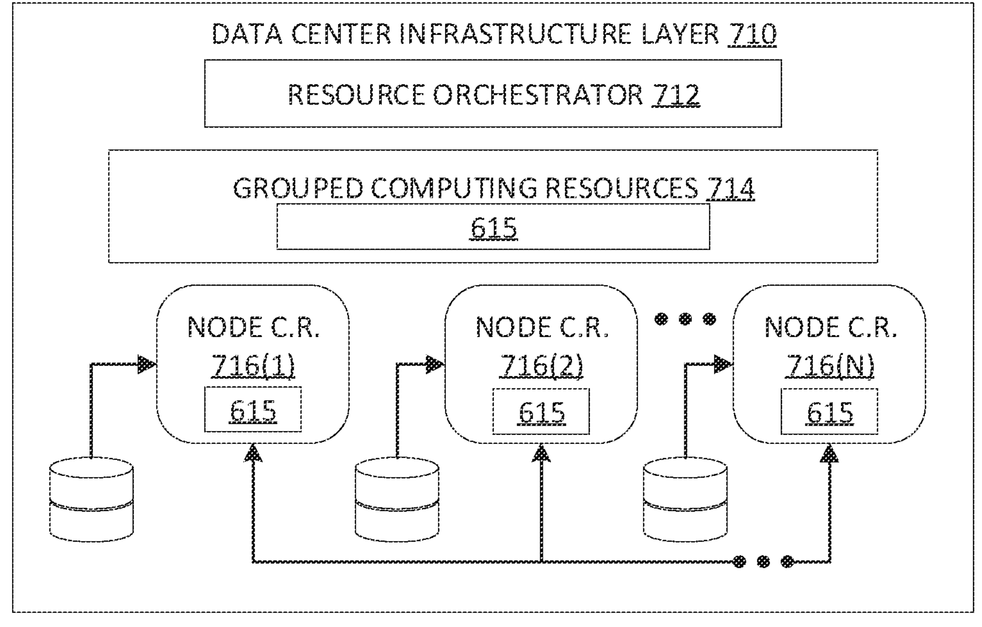
FIG. 7

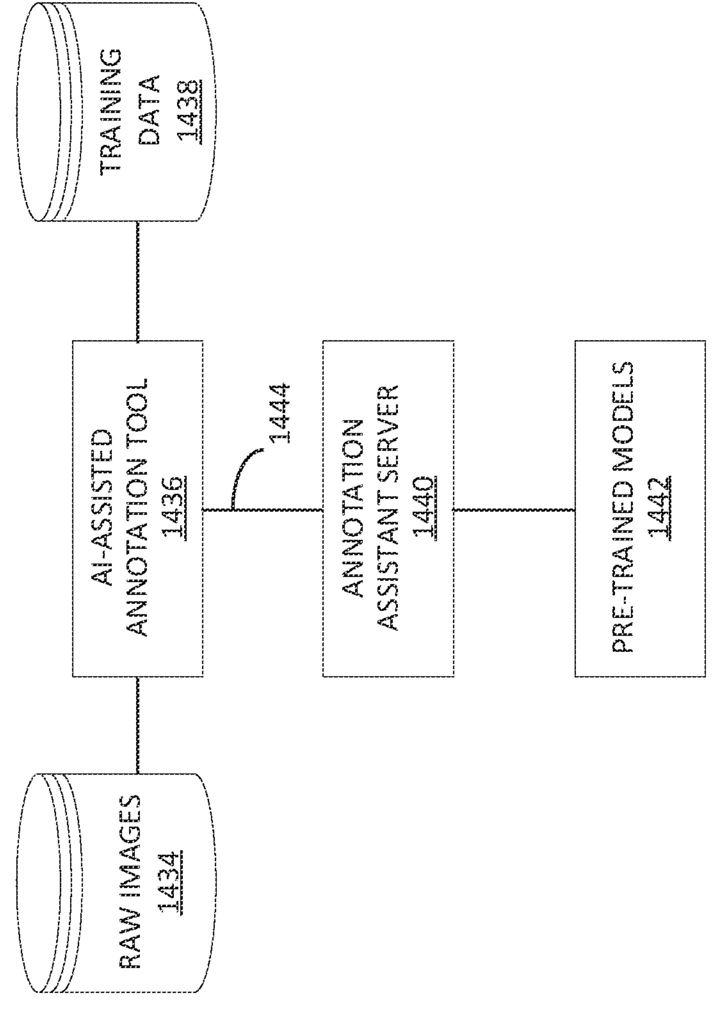
FIG. 14B

APPLICATION EXECUTION ALLOCATION USING MACHINE LEARNING

TECHNICAL FIELD

At least one embodiment pertains to assigning processing tasks of applications between processing units using machine learning. For example, a machine learning model (e.g., a neural network) can be trained to predict values for system performance metrics and/or user experience metrics based on given usage data and contextual data associated with a computing system. A processor of the computing system can determine a processing unit (e.g., an integrated graphical processing unit (iGPU), a discrete processing unit (dGPU), etc.) to execute an application based on an output of the machine learning model, according to various novel techniques described herein.

BACKGROUND

Graphics processing systems are used to perform graphics rendering and computation in modern computing systems, such as desktops, notebooks, video game consoles, etc. A graphics processing system can include various types of processing units. For example, a core processing unit of a graphics processing system can include a processing unit (e.g., a graphical processing unit (GPU)) that is integrated with a primary circuit board (e.g., a motherboard) for the system. Such a processing unit is referred to as an integrated processing unit. The graphics processing system can additionally or alternatively include a processing unit that is connected to the computing system (e.g., via a peripheral component express (PCIe) interface, etc.), but is not integrated with the system circuit board. Such a processing unit is referred to as a discrete processing unit or a dedicated processing unit. Each of the various types of processing units can provide distinct benefits and can be associated with distinct operating constraints. For example, a processing capability for a discrete processing unit can be larger than a processing capability for an integrated processing unit, but the discrete processing unit may consume a larger amount of power than the integrated processing unit.

BRIEF DESCRIPTION OF DRAWINGS

Various embodiments in accordance with the present disclosure will be described with reference to the drawings, in which:

FIG. 4 illustrates a flow diagram of an example method of assigning execution of applications to various processing units using machine learning, according to at least one embodiment, according to at least one embodiment;

FIG. 7 illustrates an example data center system, according to at least one embodiment;

FIGS. 14A and 14B illustrate a data flow diagram for a process to train a machine learning model, as well as client-server architecture to enhance annotation tools with pre-trained annotation models, in accordance with at least one embodiment.

DETAILED DESCRIPTION

Figure 1:
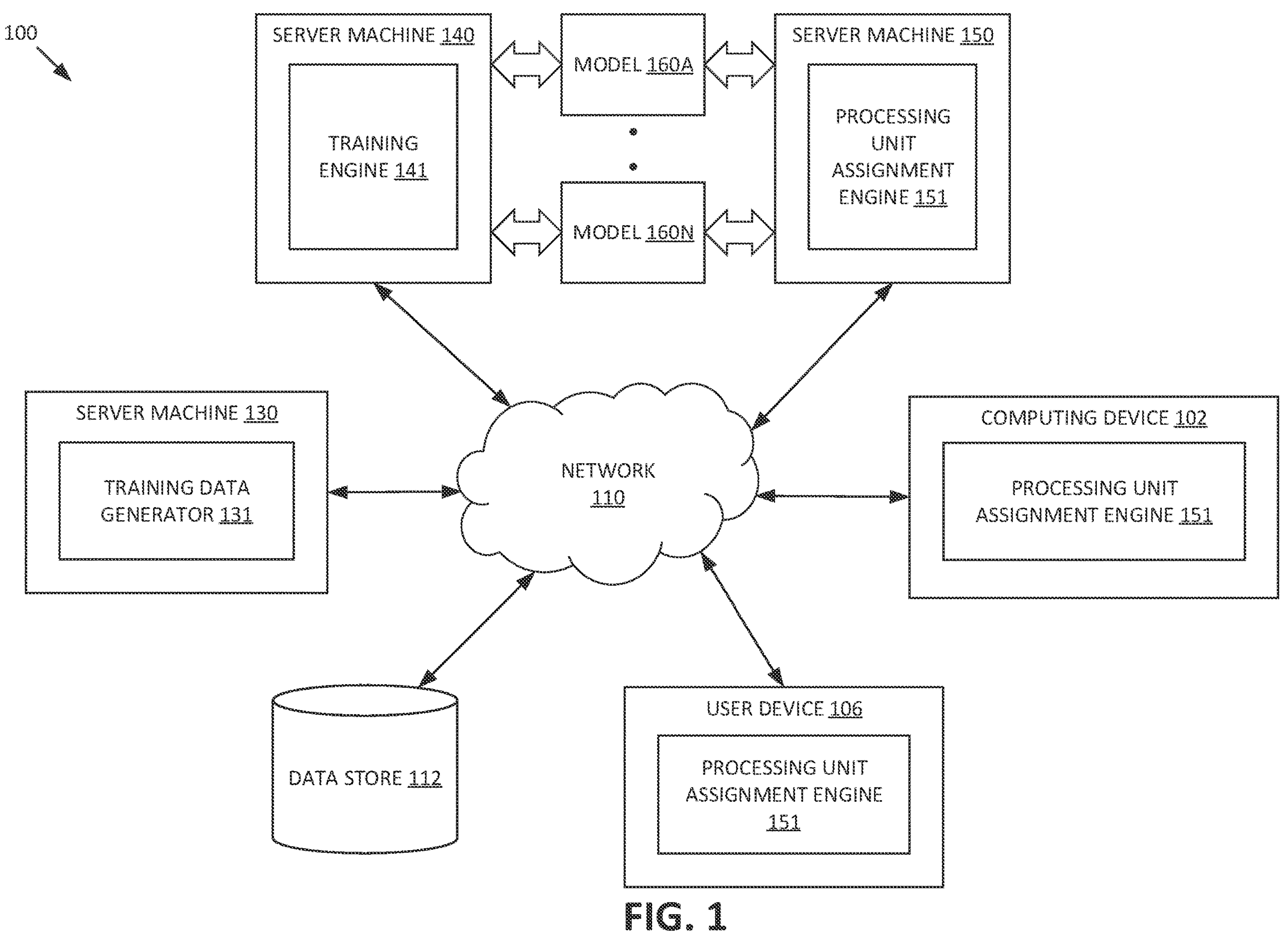
FIG. 1 is a block diagram of an example system architecture, according to at least one embodiment.

Some computing systems (e.g., graphics processing systems) can include various types of processing units. For instance, a core processing unit of a graphics processing system can include one or more graphics processing units (GPUs) that are integrated with a circuit board (e.g., a motherboard) for the system. Such GPUs are referred to as integrated GPUs or iGPUs. Integrated GPUs can share memory resources and power resources with other processing units integrated with the circuit board (e.g., central processing units (CPUs), etc.). Some graphics processing systems can additionally (or alternatively) include one or more GPUs that are connected to the computing system (e.g., via a peripheral component express (PCIe) interface, etc.) but are not integrated with the primary system circuit board. Such GPUs are referred to as discrete GPUs, dedicated GPUs, or dGPUs. Discrete GPUs can have dedicated memory resources and power resources (e.g., that are not shared with other processing units of a computing system), in some instances.

Since dGPUs have dedicated memory resources, dGPUs are able to more quickly access data and execute operations than iGPUs. Accordingly, dGPUs can be associated with an improved processing capability and capacity (e.g., a speed at which execution of operations is completed, a number of operations executed in a particular time period, etc.) as compared to a processing capacity for iGPUs. The improved capacity offered by a dGPU can improve the speed at which operations are computed and images of an application are rendered using the dGPU and/or a quality of the rendered images compared to rendering the images using an iGPU. However, dGPUs can consume a significantly larger amount of power than iGPUs, and, in some instances, can generate a significant amount of heat. The larger amount of power consumed while running an application using a dGPU for a mobile product, such as a notebook or laptop computer, can cause a battery for the mobile product to deplete more quickly than if the application is run using an iGPU. In some instances, running the program using the dGPU can cause a temperature of the notebook to increase, which can activate a noisy internal fan to cool the notebook, further impacting user experience. Such an internal fan may not adequately cool the computing system and the dGPU and/or other processing units of the computing system can overheat and may become damaged.

In some instances, static, pre-defined rules for an operating system (OS) of a computing system and/or applications running on the computing system define whether an application is to be executed on a dGPU or an iGPU. Such rules can define whether the application is to be executed on the dGPU or the iGPU in view of a type of the application, a processing workload associated with one or more features of the application, and so forth. An OS can assign applications to be executed on the dGPU or the iGPU based on these pre-defined rules before the application is launched using the computing system. In an illustrative example, an image and/or video processing application can be associated with one or more processing heavy features (e.g., editing image data and/or video data, encoding image data and/or video data, streaming image data and/or video data to other computing systems, etc.) as well as one or more non-processing heavy features (e.g., accessing images or videos, etc.). Pre-defined rules associated with the computing system can provide that the image and/or video processing application is to be executed via a dGPU, in view of the associated processing heavy features.

In some instances, a user of processing heavy applications may use such applications to access non-processing heavy features. For example, a user of an image and/or video processing application can use the application to access images rather than edit, encode and/or decode images or videos, etc. and, in some instances, may never or may rarely use the application to edit, encode and/or decode the images or videos. An iGPU can perform such non-processing heavy features in accordance with target performance metrics (e.g., efficiency metrics, latency metrics, etc.) for the computing system without consuming a significantly large amount of power and impacting user experience of the application. However, as indicated above, conventional systems assign execution of processing heavy applications (e.g., including processing heavy and non-processing heavy features) to the dGPU due to the processing heavy features of the application (e.g., per the pre-defined rules for the computing system). Accordingly, non-processing heavy features of the application are executed on the dGPU instead of the iGPU, and the dGPU consumes a significantly large amount of power to execute the non-processing heavy features of the application. The dGPU's large consumption of power at the computing system can increase the temperature of the computing system, which can impact user experience and, in some instances, cause damage to the dGPU and/or other processing units or components of the computing system, as indicated above.

Examples of the heavy processing applications may include processing tasks to implement one or more portions of one or more operations, such as one or more operations for gaming, machine control, machine locomotion, machine driving, synthetic data generation, model training, perception, augmented reality, virtual reality, mixed reality, robotics, security and surveillance, autonomous or semi-autonomous machine applications, deep learning, environment simulation, data center processing, conversational AI, light transport simulation (e.g., ray tracing, path tracing, etc.), collaborative content creation for 3D assets, digital twin systems, cloud computing and/or any other suitable applications.

Embodiments of the present disclosure address the above and other deficiencies by providing techniques for dynamically assigning execution of an application to iGPUs or dGPUs of a computing system. A processor of the computing system can identify usage data associated with an application that is to be executed using the computing system. In some embodiments, the usage data can include data associated with executing the application via an iGPU or a dGPU of the computing system. For example, the application can be an image and/or video processing application. The usage data can include an indication of one or more features (e.g., processing heavy features, non-processing heavy features, etc.) historically accessed by a user of the image and/or video processing application using the computing system. In other or similar embodiments, usage data can include data received in response to an inquiry to a user of the computing system regarding the features that the user is expecting to access while the application is executed. In some embodiments, the usage data additionally or alternatively includes an indication of historical telemetry data (e.g., temperature data, memory usage data, processor utilization data, a record of lag and/or time to completion, a record of clipping or down-sampling, etc.) associated with executing the one or more features historically accessed (or to be accessed) by the user of the application on the computing system. The historical telemetry data may be generated using utilization sensors of the dGPU and/or the iGPU, in some embodiments.

The processor can provide the usage data as input to a machine learning model. The machine learning model can be trained to predict values for one or more system performance metrics (e.g., clock data associated with the iGPUs and/or the dGPUs, a measured efficiency associated with executing the application, etc.) and/or one or more user experience metrics (e.g., an amount of power consumed from a battery of the computing system during execution of the application, a number of errors or glitches that occur during execution of the application, a temperature of the computing system during execution of the application, etc.) associated with executing the application using the iGPU and the dGPU. The machine learning model can be trained (e.g., at one or more remote servers or data centers) using historical usage data associated with running the application (or another application) via iGPUs and/or dGPUs of the computing system (or another computing system) and historical contextual data associated with the computing system (or the other computing system), as described herein.

The processor can obtain one or more outputs of the machine learning model and can extract, from the one or more obtained outputs, values for performance metrics and/or values for user experience metrics associated with executing the application using the iGPU and the dGPU. For example, the processor can extract a first performance metric value and/or a first user experience metric value associated with executing the application using the iGPU and a second performance metric value and/or a second user experience metric value associated with executing the application using the dGPU. The processor can determine whether to execute the application via the iGPU or the dGPU in view of the extracted performance metric values and/or the user experience metric values, in some embodiments. For example, the processor can determine whether the first performance metric value and/or the first user experience metric value satisfy one or more application processing criteria. The application processing criteria can include one or more threshold values that correspond to minimal performance conditions and/or optimal user experience conditions for the computing system. Further details regarding the application processing criteria are provided herein. If the processor determines that the first performance metric value and/or the first user experience metric value satisfy the one or more application processing criteria, the processor can cause the application to be executed via the iGPU. If the processor determines that the first performance metric value and/or the first user experience metric value do not satisfy the one or more application processing criteria (and/or that the second performance metric value and/or the second user experience metric value satisfy the application processing criteria), the processor can cause the application to be executed via the dGPU.

In some embodiments, the trained machine learning model outputs an inference corresponding to a designation of whether to use an iGPU or a dGPU for execution of an application without outputting experience metric values. For example, the trained machine learning model may output a pair of values, where a first value indicates a first probability that execution on an iGPU would be optimal and a second probability that execution on a dGPU would be optimal. A GPU may be selected for execution of the application that has the highest probability of being an optimal iGPU.

In some embodiments, whether to run an application using a dGPU or an iGPU may be determined without the application of machine learning. For example, telemetry data associated with historical execution of an application may be input into a rule-based decision engine that outputs a decision as to whether to execute an application using a dGPU or an iGPU.

Aspects and embodiments of the present disclosure provide techniques to dynamically assign execution of applications to a processing unit of a computing system based on an expected use of the application. As indicated above, a computing system can assign an application to be run using a particular type of processing unit (e.g., an iGPU, a dGPU, a data processing unit (DPU), a fixed function circuit, a hardware accelerator such as deep learning accelerator, vision or vector processing unit, tensor processing unit, etc.) based on performance metric values and/or user experience metric values predicted based on usage data for the application. The performance metric values and/or the user experience metric values (e.g., included in the one or more outputs of a trained machine learning model) can indicate to the computing system a predicted performance level and/or user experience associated with running the application using each type of processing unit. The computing system can use the performance metric values and/or user experience values to assign the application to be run using a processing unit that satisfies minimal performance conditions and/or optimal user experience conditions, rather than automatically assigning the application to be run using the most powerful processing unit available (e.g., the dGPU). Accordingly, embodiments of the present disclosure enable the computing system to ensure that an application is executed or partially executed using a processing unit that satisfies minimal performance conditions while avoiding unnecessarily running the application on a processing unit that consumes a significant amount of power and negatively impacts the users' experience.

In an illustrative example, usage data for an image and/or video processing application can indicate that the user of the computing system is to use non-processing heavy features of the application and the user is not to use processing heavy features of the application. The computing system can assign the application to be run using the iGPU responsive to determining that an application efficiency metric value for the iGPU (e.g., indicated by one or more outputs of the machine learning model) meets or exceeds a minimal application efficiency threshold value of the one or more application processing criteria. The computing system can further assign the application to be run using the iGPU responsive to determining that an application power consumption metric value for the iGPU meets or falls below an optimal power consumption threshold value of the one or more application processing criteria and/or a user experience metric value for the dGPU exceeds an optimal power consumption threshold value.

The systems and methods described herein may be used for a variety of purposes, by way of example and without limitation, these purposes may include systems or applications for online multiplayer gaming, machine control, machine locomotion, machine driving, synthetic data generation, model training, perception, augmented reality, virtual reality, mixed reality, robotics, security and surveillance, autonomous or semi-autonomous machine applications, deep learning, environment simulation, data center processing, conversational AI, light transport simulation (e.g., ray tracing, path tracing, etc.), collaborative content creation for 3D assets, digital twin systems, cloud computing and/or any other suitable applications.

Disclosed embodiments may be comprised in a variety of different systems such as systems for participating on online gaming, automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems implemented using an edge device, systems incorporating one or more virtual machines (VMs), systems for performing synthetic data generation operations, systems implemented at least partially in a data center, systems for performing conversational AI operations, systems for performing light transport simulation, systems for performing collaborative content creation for 3D assets, systems for generating or maintaining digital twin representations of physical objects, systems implemented at least partially using cloud computing resources, and/or other types of systems.

FIG. 1 is a block diagram of an example system architecture 100, according to at least one embodiment. The system architecture 100 (also referred to as "system" herein) includes computing device 102, a user device 106, one or more data stores 112 (collectively and individually referred to as data store 112 herein), and server machine 130, server machine 140, and/or server machine 150, each connected by a network 110. In implementations, network 110 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

Computing device 102 may be a desktop computer, a laptop computer, a smartphone, a tablet computer, a server, or any suitable computing device capable of performing the techniques described herein. In some embodiments, computing device 102 may be a computing device of a cloud computing platform. For example, computing device 102 may be, or may be a component of, a server machine of a cloud computing platform. In such embodiments, computing device 102 may be coupled to one or more edge devices (not shown) via network 110. An edge device refers to a computing device that enables communication between computing devices at the boundary (e.g., interface) between two networks. For example, an edge device may be connected to computing device 102, user device 106, data store 112, server machine 130, server machine 140, and/or server machine 150 via network 110, and may be connected to one or more endpoint devices (not shown) via another network. In such example, the edge device can enable communication between computing device 102, user device 106, data stores 112, server machine 130, server machine 140, and/or server machine 150 and the one or more client devices. In other or similar embodiments, computing device 102 may be, or may be a component of, an edge device. For example, computing device 102 may facilitate communication between data stores 112, user device 106, server machine 130, server machine 140, and/or server machine 150, which are connected to computing device 102 via network 110, and user device 106 (or one or more other user devices and/or other computing devices) that are connected to computing device 102 via another network.

User device 106 can include any computing device 102 that enables users to access features of an application. For example, user device 106 may be, or may be a component of, devices such as, but not limited to: televisions, smart phones, cellular telephones, personal digital assistants (PDAs), portable media players, netbooks, laptop computers, electronic book readers, tablet computers, desktop computers, set-top boxes, gaming consoles, autonomous vehicles, surveillance devices, and the like. In some embodiments, computing device 102 may be an edge device that connects user device 106 to data stores 112, server machine 130, server machine 140 and/or server machine 150. In other or similar embodiments, computing device 102 may not connect user device 106 to user device 106 to data stores 112, server machine 130, server machine 140 and/or server machine 150 and instead may provide user device 106 with data obtained by computing device 102 from one or more of user device 106 to data stores 112, server machine 130, server machine 140 and/or server machine 150. In additional or alternative embodiments, computing device 102 and user device 106 may be the same device and/or share the same or similar components.

User device 106 can include one or more types of processing units, in some embodiments. A processing unit refers to component that performs logical and/or arithmetical operations on data. In some embodiments, user device 106 can include one or more processing units that are integrated (e.g., welded, etc.) to a circuit board (e.g., a motherboard) of user device 106. For example, user device 106 can include one or more central processing units (CPUs) and/or one or more graphical processing units (GPUs). GPUs include any processing unit that is specially designed to accelerate graphics rendering (e.g., for applications running on user device 106, etc.). A GPU that is integrated to a circuit board of user device 106 is referred to herein as an integrated GPU or simply an iGPU. In additional or alternative embodiments, user device 106 can include one or more processing units that are connected to one or more other components of user device 106, but are not integrated to a circuit board of user device 106. For example, user device 106 can include one or more GPUs that are connected to other components of user device 106 (e.g., a CPU, etc.) via a peripheral component interconnect express (PCIe) interface. Such GPU is referred to herein as a discrete GPU, a dedicated GPU, or simply a dGPU. Further details regarding iGPUs and dGPUs at user device 106 are provided with respect to FIG. 2.

In some embodiments, computing device 102 and/or user device 106 may include a processing unit assignment engine 151. Processing unit assignment engine 151 may be configured to assign execution of one or more portions of an application to various processing units of user device 106. As described above, user device 106 can include one or more iGPUs and one or more dGPUs, in some embodiments. Processing unit assessment engine 151 can assign one or more portions of an application (e.g., or all portions of an application) to be executed using the one or more iGPUs and/or the one or more dGPUs. It should be noted that although some embodiments of the present disclosure refer to assigning an application for execution using iGPUs or dGPUs of user device 106, embodiments of the present disclosure can be applied to assign a portion of application for executing using the iGPUs or dGPUs or user device 106 (or any other type of processing unit at user device 106). For example, processing unit assessment engine 151 can assign one or more operations of the application for execution using an iGPU of user device 106 and one or more additional operations of the application for executing using a dGPU of user device 106, in accordance with embodiments of the present disclosure.

In some embodiments, processing unit assignment engine 151 may be configured to assign execution of the one or more operations of the application to various processing units based on one or more outputs of a machine learning (ML) model. In some embodiments, processing unit assignment engine 151 may obtain data associated with an application to be executed using processing units of user device 106 and provide the obtained data as input to a machine learning model (e.g., one or more of ML models 160A-N). In some embodiments, the obtained data can include usage data associated with the application. The usage data can include historical data associated with features of the application accessed by a user of user device 106 during execution of the application using an iGPU or a dGPU of user device 106, in some embodiments. In other or similar embodiments, the usage data can include data indicating which features of the application the user plans to access during execution of the application using the iGPU or the dGPU. In some embodiments, the usage data can additionally or alternatively include telemetry data associated with the features historically accessed (or to be accessed) by the user of the computing system. In some embodiments, the obtained data can additionally or alternatively include context data associated with the user device 106. Context data (also referred to as contextual data) can indicate a current context or a current state of the user device 106. For example, context data can include a type associated with each processing unit, a pipeline state of each processing unit (e.g., an iGPU, a dGPU, etc.) of user device 106, a hardware state of each processing unit of user device 106, a driver state of user device 106, and so forth. Further details regarding usage data and context data are provided herein.

In some embodiments, processing unit assignment engine 151 can obtain the usage data and/or context data from data store 112. Data store 112 can include persistent storage that is capable of storing data (e.g., usage data, context, data, etc.). Data store 112 may be hosted by one or more storage devices, such as main memory, magnetic or optical storage based disks, tapes or hard drives, NAS, SAN, and so forth. In some implementations, data store 112 may be a network-attached file server, while in other embodiments data store 112 may be some other type of persistent storage such as an object-oriented database, a relational database, and so forth, that may be hosted by computing device 102 or one or more different machines coupled to the computing device 102 via network 110. As illustrated in FIG. 1, system 100 can include a single data store 112, in some embodiments. In additional or alternative embodiments, system 100 can include multiple data stores 112, as indicated above. In some embodiments, a first data store may be configured to store data that is accessible only to computing device 102, server machine 130, server machine 140, and/or server machine 150. For example, the first data store may be or include a domain-specific or organization-specific repository or data base. In some embodiments, computing device 102, server machine 130, server machine 140, and/or server machine 150 may only be able to access the first data store via network 110, which may be a private network. In other or similar embodiments, data stored at the first data store may be encrypted and may be accessible to computing device 102, server machine 130, server machine 140, and/or server machine 150 via an encryption mechanism (e.g., a private encryption key, etc.). In additional or alternative embodiments, a second data store may be configured to store data that is accessible to any device that is accessible to the second data store via any network. For example, the second data store may be or include a publicly accessible repository or database that is accessible to any device via a public network. In additional or alternative embodiments, data store 112 may be configured to store first data (e.g., usage data, context data, etc.) that is accessible only to computing device 102, server machine 130, server machine 140, and/or server machine 150 (e.g., via private network 110, via an encryption mechanism, etc.) and second data that is accessible to devices that are connected to data store via another network (e.g., a public network).

Data store 112 can be configured to store other types of data, in some embodiments. For example, data store 112 can include metric data indicating values for one or more metrics associated with executing one or more applications using processing units of one or more user devices and/or other computing devices. The metric data can indicate values for one or more performance metrics and/or user experience metrics collected or otherwise obtained for applications running using processing devices of one or more user devices and/or other computing devices. Further details regarding metric data is described herein.

Processing unit assignment engine 151 can provide the obtained usage data and/or context data as input to a machine learning model (e.g., one or more of ML models 160A-N) that is trained to predict one or more system performance metric values and/or one or more user experience metric values associated with executing the application using iGPUs and dGPUs at the user device 106 based on at least given usage data. A system performance metric refers to any metric indicating a performance of the user device 106 during execution of an application. For example, system performance metrics can include clock data associated with an iGPU and/or a dGPU of user device 106 during execution of one or more operations of an application, a measured efficiency associated with executing the application using the iGPU and/or the dGPU, and so forth. A user experience metric refers to any metric indicating a user experience with the application and/or the user device 106 during execution of one or more operations of the application. For example, user performance metrics can include an amount of power consumed by user device 106 during execution of the application using an iGPU and/or a dGPU of the user device 106, a number of errors or glitches detected during execution of the application using the iGPU and/or the dGPU, a temperature of the user device 106 during execution of the application using the iGPU and/or the dGPU, and so forth. Details regarding training and using machine learning model 160 are provided herein.

Server machine 130 may include a training data generator 131 that is capable of generating training data (e.g., a set of training inputs and a set of target outputs) to train ML models 160A-N (collectively and individually referred to as ML model 160 herein). Training data generator 131 may generate training data based on data associated with the executing of applications using processing units of one or more user devices 106 and/or other computing devices 102 (e.g., stored at data store 112 or another data store connected to system 100 via network 110 or another network), in some embodiments. In some embodiments, ML model 160 can be a supervised machine learning model. In such embodiments, training data used to train ML model 160 can include a set of training inputs and a set of target outputs for the training inputs. The training inputs can include usage data associated with executing an application, or operations of the application, using one or more processing units (e.g., an iGPU and/or a dGPU) of a user device 106 and/or computing device 102. The training inputs can additionally include context data associated with the one or more processing units and/or the user device 106 during execution of the application, or the operations of the application, in some embodiments. The target outputs can include values for one or more system performance metrics and/or user experience metrics associated with executing the application using the one or more processing units. Training data generator 131 can determine the target outputs based on metric data (e.g., stored at data store 112), in accordance with embodiments described herein.

Server machine 140 may include a training engine 141. Training engine 141 may train ML model 160 using the training data from training set generator 131. The ML model 160 may refer to the model artifact that is created by the training engine 141 using the training data that includes training inputs and corresponding target outputs (correct answers for respective training inputs). The training engine 141 may find patterns in the training data that map the training input to the target output (the answer to be predicted), and provide the ML model 160 that captures these patterns. The ML model 160 may be composed of, e.g., a single level of linear or non-linear operations (e.g., a support vector machine (SVM or may be a deep network, i.e., a machine learning model that is composed of multiple levels of non-linear operations). An example of a deep network is a neural network with one or more hidden layers, and such a machine learning model can be trained by, for example, adjusting weights of a neural network in accordance with a backpropagation learning algorithm or the like. For convenience, the remainder of this disclosure will refer to the implementation as a neural network, even though some implementations might employ an SVM or other type of learning machine instead of, or in addition to, a neural network. It should be noted that ML model 160 can additionally or alternatively use one or more of support vector machine (SVM), Radial Basis Function (RBF), clustering, supervised machine learning, semi-supervised machine learning, unsupervised machine learning, k-nearest neighbor algorithm (k-NN), linear regression, random forest, a boosted decision forest, etc. In some embodiments, the training data may be obtained by training data generator 131 hosted by server machine 130. For example, training engine 141 may obtain first training data to train a teacher object detection model and second training data to train a student object detection model from training set generator 131. Further details regarding generating training data for and training ML model 160 are provided with respect to FIG. 2.

Server 150 may include a processing unit assignment engine 151, in some embodiments. As described above, processing unit assignment engine 151 can assign execution of one or more operations of an application to be executing using a user device 106 to various processing units (e.g., iGPUs, dGPUs, etc.) of the user device 106. In some embodiments, processing unit assignment engine 151 can obtain usage data associated with the application and/or context data associated with the user device and provide the usage data and/or context data as input to ML model 160. As described above, the usage data and/or context data can be stored at data store 112, in some embodiments. In other or similar embodiments, the usage data and/or context data can be provided by user device 106. Processing unit assignment engine 151 can obtain one or more outputs of ML model 160. The one or more outputs can include metric data indicating one or more performance metric values and/or one or more user experience metric values associated with executing operations of the application using one or more processors of the user device 106. In an illustrative example, the one or more outputs can include an indication of a first performance metric value and/or a first user experience metric value associated with executing operations of the application using an integrated processing unit (e.g., an iGPU) of user device 106 and an indication of a second performance metric value and/or a second user experience metric value associated with executing operations of the application using a discrete processing unit (e.g., a dGPU). Processing unit assignment engine 151 can cause one or more operations to be executed via the integrated processing unit and/or the discrete processing unit in view of the at least one of the first performance metric value and/or the first user experience metric value and the second performance metric value and/or the second user experience metric value, in accordance with embodiments provided herein.

As illustrated in FIG. 1, processing unit assignment engine 151 can be included at server machine 150, computing device 102, and/or user device 106. In an illustrative example, server machine 150 can be an inference server machine of a predictive system of a manufacturing and/or development environment. Computing device 102 can be a client device or other type of device that enables an engineer and/or developer of the manufacturing and/or development environment to access one or more of processing unit engine 151, training data generator 131, training engine 141, and/or data store 112. User device 106 can be associated with a user (e.g., a subscriber) of one or more services provided by system 100, in such example. Processing unit assignment engine 151 can be configured to assign execution of operations using various processing units of user device 106, as described herein, and provide an indication of the assignment to computing device 102 and/or user device 106 (e.g., via network 110). In additional or alternative embodiments, processing unit assignment engine 151 can store an indication of the assignment at data store 112. Computing device 102 and/or user device 106 can access the assignment stored at data store 112 (e.g., via network 110). In additional or alternative embodiments, processing unit assignment engine 151 running at computing device 102 and/or user device 106 can assign execution of operations of the application, as described herein.

In some implementations, computing device 102, user device 106, data store(s) 112, and/or server machines 130-150, may be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to enable assignment of execution of an application using various processing units of user device 106. It should be noted that in some other implementations, the functions of computing device 102, user device 106, server machines 130, 140, and/or 150 may be provided by a fewer number of machines. For example, in some implementations server machines 130, 140, and 150 may be integrated into a single machine, while in other implementations server machines 130, 140, and 150 may be integrated into multiple machines. In addition, in some implementations one or more of server machines 130, 140, and 150 may be integrated into computing device 102 and/or user device 106. In general, functions described in implementations as being performed by computing device 102 and/or or server machines 130, 140, 150 may also be performed on one or more edge devices (not shown) and/or client devices (not shown), if appropriate. In addition, the functionality attributed to a particular component may be performed by different or multiple components operating together. Computing device 102 and/or server machines 130, 140, 150 may also be accessed as a service provided to other systems or devices through appropriate application programming interfaces.

Figure 2:
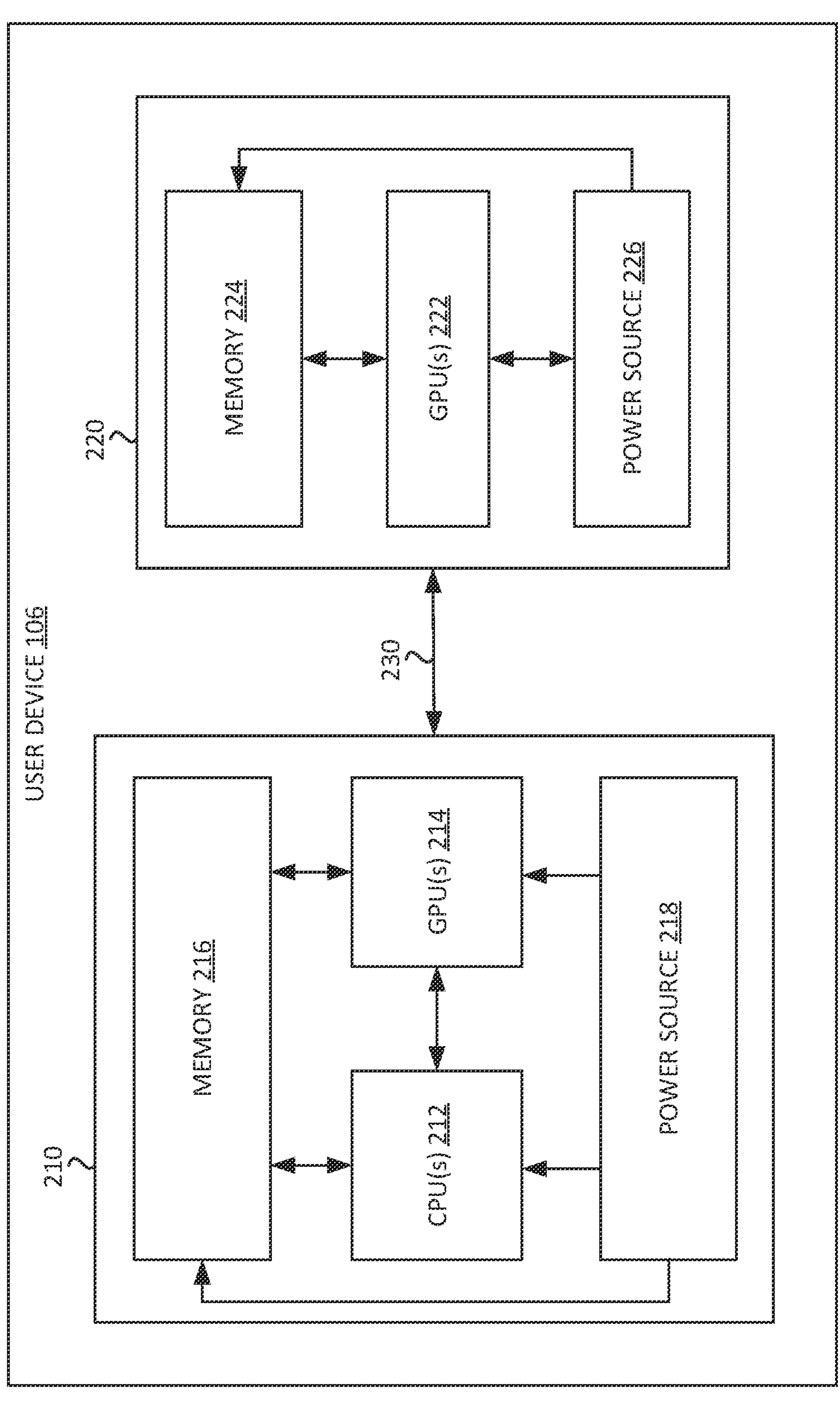
FIG. 2 is a block diagram of an example user device including one or more integrated processing units and one or more discrete processing units, according to at least one embodiment.

FIG. 2 is a block diagram of an example user device 106 including one or more integrated processing units and one or more discrete processing units, according to at least one embodiment. As illustrated in FIG. 2, user device 106 can include a circuit board 210 (e.g., a motherboard, etc.). A motherboard can include principal components of a computing system with connectors between each of the principal components. In some embodiments, circuit board 210 can include and/or can connect components to at least one or more CPUs 212, one or more GPUs 214, memory 216, and/or a power source 218. CPUs 212 and/or GPUs 214 are referred to as integrated processing units, in accordance with embodiments of the present disclosure. Memory 216 can include volatile memory and/or non-volatile memory, in some embodiments. Power source 218 can include any type of power source or power supply that is configured to supply power to one or more components of circuit board 210. In some embodiments, power source 218 includes a rechargeable battery power supply. Components of circuit board 210 can each be connected via various connectors, in some embodiments. For example, CPU(s) 212, GPU(s) 214, and/or memory 216 can be connected via a bus. Power source 218 can provide power to CPU(s) 212, GPU(s) 214, and/or memory 216 via a power supply connector, in some embodiments.

As illustrated in FIG. 2, user device 106 can include a discrete sub-system 220. Discrete sub-system 220 can be connected to one or more components of circuit board 210 via one or more interface connectors 230. For example, discrete sub-system 220 can be connected to one or more components of circuit board 210 via a PCIe connector, or another type of connector (e.g., such as an InfiniBand connector, a RapidIO connector, and so on). Discrete sub-system 220 can include one or more GPUs 222, memory 224, and/or power source 226. GPUs 222 of discrete sub-system 220 are referred to herein as discrete processing units or dedicated processing units, in accordance with embodiments of the present disclosure. Memory 216 can include volatile and/or non-volatile memory, in some embodiments. Power source 218 can include any type of power source or power supply (e.g., a rechargeable battery power supply, etc.) that is configured to supply power to one or more components of discrete sub-system 220. GPU(s) 222 can be connected to memory 224 via a bus, in some embodiments. Power source 226 can provide power to GPU(s) 222 and/or memory 224 via a power supply connector, in some embodiments.

In some embodiments, CPUs 212 and/or GPUs 214 can share computing resources (e.g., memory 216, power source 218) of circuit board 210. Memory 224 and/or power source 226 can be dedicated for use only by GPUs 222, in additional or alternative embodiments. In other or similar embodiments, discrete sub-system 220 may not include a separate memory 224. For example, a region of memory 216 can be allocated (e.g., by an operating system running on CPU(s) 212) for GPU(s) 222. GPU(s) 222 can access the allocated region of memory 216 via interface connector(s) 230. In some embodiments, discrete sub-system 220 can include a dedicated graphics card.

As indicated above, one or more applications can run using processing units of user device 106. For example, an application can be installed at user device 106 and processing units of user device 106 can be configured to execute operations of the installed application. In another example, an application hosted by a cloud computing system (e.g., of system 100) can be instantiated at user device 106. In some embodiments, an operating system (OS) (e.g., running using CPU(s) 212) can assign one or more operations of an application to be run using GPU(s) 214 and/or GPU(s) 222, as described above. For example, prior to initialization and/or instantiation of the application at user device 106, user device 106 can identify assignment data indicating one or more types of operations of the application that are to be executed using GPU(s) 214 and/or GPU(s) 222. The assignment data can be determined (e.g., by processing unit assignment engine 151) based on data collected during a prior time period during which the application was run using user device 106 and/or based on an expected usage of the application, in accordance with embodiments described herein. In some embodiments, the assignment data can be stored at memory 216 and/or memory 224 of user device 106. For example, the assignment data can be determined by processing unit assignment engine 151 (e.g., at user device 106) and can be stored at memory 216 prior to and/or during initialization and/or instantiation of the application at user device 106. In another example, the assignment data can be determined by processing unit assignment engine 151 (e.g., at computing device 102, at server machine 150, etc.) and can be provided to user device 106 (e.g., via network 110). User device 106 can store the assignment data at memory 216 and/or memory 224, as described above.

After the application is initialized and/or instantiated at user device 106, the OS (not shown) can cause one or more operations of the application for execution using GPU(s) 214 and/or GPU(s) 222 in accordance with the assignment data. For example, the assignment data can indicate that all operations of the application are to be executed using GPU(s) 214 or using GPU(s) 222. The OS can cause all operations of the application to be executed using GPU(s) 214 or using GPU(s) 222 in accordance with the assignment data. In another example, the assignment data can indicate that a portion of the operations of the application (e.g., operations associated with non-processing heavy features) are to be executed using GPU(s) 214 and another portion of the operations of the application (e.g., operations associated with processing heavy features) are to be executed using GPU(s) 222. The OS can detect that a particular operation is to be executed for the application (e.g., if the operation is added to a queue for operations to be executed) and can cause the operation to be executed using the GPU(s) 214 or GPU(s) 222 based on the assignment data. In some embodiments, the OS can cause an operation to be executed using GPU(s) 214 and/or GPU(s) 222 by adding the operation to an executing queue associated with such processing units.

In some embodiments, the OS, processing unit assignment engine 151 and/or another component running on user device 106 can collect data associated with features of the application that are accessed by a user of user device 106. For example, an application running on user device 106 can be an image and/or video processing application. The application can include one or more non-processing heavy features (e.g., accessing videos, images, etc.) and one or more processing heavy features (e.g., editing image data and/or video data, encoding image data and/or video data, streaming image data and/or video data, etc.). As the application is running using user device 106, the OS and/or processing unit assignment engine 151 (or another component) can monitor which features of the application the user is accessing and store an indication of the monitored features to memory 216 and/or memory 224 as usage data. In other or similar embodiments, the OS and/or processing unit assignment engine 151 (or another component) can provide a notification to a user of user device 106 (e.g., via a graphical user interface (GUI) for user device 106) inquiring which features of the application the user is planning to access. The user can provide an indication of the planned features to the user device 106 (e.g., via the GUI). The OS and/or processing unit assignment engine 151 (or another component) can store the indicated features at memory 216 and/or memory 224 as usage data. In some embodiments, the OS can provide the usage data to processing unit assignment engine 151 (e.g., at user device 106, at computing device 102, at server machine 150, etc.). Processing unit assignment engine 151 can use the usage data to assign execution of operations of the application using GPU(s) 214 and/or GPU(s) 222 during a future initialization or instantiation of the application at user device 106, in accordance with embodiments described herein. In additional or alternative embodiments, the OS, processing unit assignment engine 151, and/or another component can provide the usage data to training data generator 131 to be used to generate training data for training a machine learning model (e.g., model 160), as described herein.

In some embodiments, the OS, processing unit assignment engine 151 and/or another component running on user device 106 can collect context data associated with running the application using GPU(s) 214 and/or GPU(s) 222. As indicated above, context data can include a pipeline state of GPU(s) 214, a pipeline state of GPU(s) 222, a hardware state of GPU(s) 214, a hardware state of GPU(s) 222, and/or a driver state of user device 106. In an illustrative example, the OS, processing unit assignment engine 151 and/or another component can detect that operations for a particular feature are executing or to be executed using GPU(s) 214 and/or GPU(s) 222. The OS, processing unit assignment engine 151, and/or the other component can collect the context data for user device 106 during execution of the operations and can store the collected context data at memory 216 and/or memory 224. In another example, the OS, processing unit assignment engine 151, and/or another component can collect the context data for user device 106 at a time period during which the application is not running using the user device 106. In some embodiments, the OS, processing unit assignment engine 151, and/or another component can provide the context data to processing unit assignment engine 151 (e.g., at user device 106, at computing device 102, at server machine 150, etc.). Processing unit assignment engine 151 can use the context data to assign execution of operations of the application using GPU(s) 214 and/or GPU(s) 222 during a future initialization or instantiation of the application at user device 106, in accordance with embodiments described herein. In additional or alternative embodiments, the OS, processing unit assignment engine 151, and/or another component can provide the context data to training data generator 131 to be used to generate training data for training a machine learning model (e.g., model 160), as described herein.

In some embodiments, CPU(s) 212, GPU(s) 214, and/or GPU(s) 222 can each include, or can be connected to, one or more utilization sensors. Utilization sensors can collect data associated with a usage or utilization of a processing unit. In some embodiments, utilization sensors of CPU(s) 212, GPU(s) 214, and/or GPU(s) 222 can collect data indicating a usage of a respective processing unit (e.g., an amount of utilization each processing unit has undergone at any given time), an amount of memory (e.g., RAM) being used by the respective processing unit at any given time, an amount of energy consumed by the respective processing unit, a temperature of the respective processing unit at any given time, an amount of time (e.g., of a particular time period) during which one or more kernels (e.g., of an application) were executing on the respective processing unit, an amount of time that a memory controller associated with the respective processing unit was busy, and so forth. Utilization sensors can include one or more of power draw sensors, temperature sensors, processing cycle clocks counters, flop counters, and so forth. In additional or alternative embodiments, additional usage data can be collected based on work queues in one or more software modules, monitored bandwidth of a memory sub-system, monitored bandwidth of processor interconnects (e.g., CPU/GPU interconnects), and so forth. Data collected by utilization sensors for GPU(s) 214 and/or GPU(s) 222 (and/or the additional usage data) can be used as telemetry data for GPU(s) 214 and/or GPU(s) 222, as described herein. Prior to or during execution of the operations of an application running at user device 106, the utilization sensors for GPU(s) 214 and/or GPU(s) 222 can collect data, as described above. The OS, processing unit assignment engine 151, and/or the other component can obtain the data from the utilization sensors and can store the obtained data as telemetry data at memory 216 and/or memory 224. In some embodiments, the OS can provide the telemetry data to processing unit assignment engine 151 (e.g., at user device 106, at computing device 102, at server machine 150, etc.). Processing unit assignment engine 151 can use the telemetry data to assign execution of operations of the application using GPU(s) 214 and/or GPU(s) 222 during a future initialization or instantiation of the application at user device 106, in accordance with embodiments described herein. In additional or alternative embodiments, the OS, processing unit assignment engine 151, and/or another component can provide the telemetry data to training data generator 131 to be used to generate training data for training a machine learning model (e.g., model 160), as described herein.

In additional or alternative embodiments, the OS, processing unit assignment engine 151, and/or another component of user device 106 can determine performance metric data and/or user experience data associated with an application running using user device 106. As indicated above, performance metric data can include system performance metrics that indicate a performance of user device 106 during execution of the application using processing units of user device 106. System performance metrics can include, clock data associated with GPU(s) 214 and/or GPU(s) 222 during execution of operations of the application, a measured efficiency associated with executing the applications using GPU(s) 214 and/or GPU(s) 222, and so forth. User experience data can include any metric indicating a user experience with the application and/or user device 106 during execution of the application using processing units of user device 106. User experience metrics can include an amount of power consumed by user device 106 during execution of the application using GPU(s) 214 and/or GPU(s) 222, a number of errors or glitches detected during execution of the application using GPU(s) 214 and/or GPU(s) 222, a temperature of user device 106 during execution of the application using GPU(s) 214 and/or GPU(s) 222, and so forth. In some embodiments, the OS, processing unit assignment engine 151 and/or another component of user device 106 can provide the determined performance metric data and/or the user experience data to training data generator 131. For example, the data can be transmitted to training data generator 131 via network 110, as described above. In another example, the data can be stored at data store 112. Training data generator 131 can access the data at data store 112, as described above.

Figure 3:
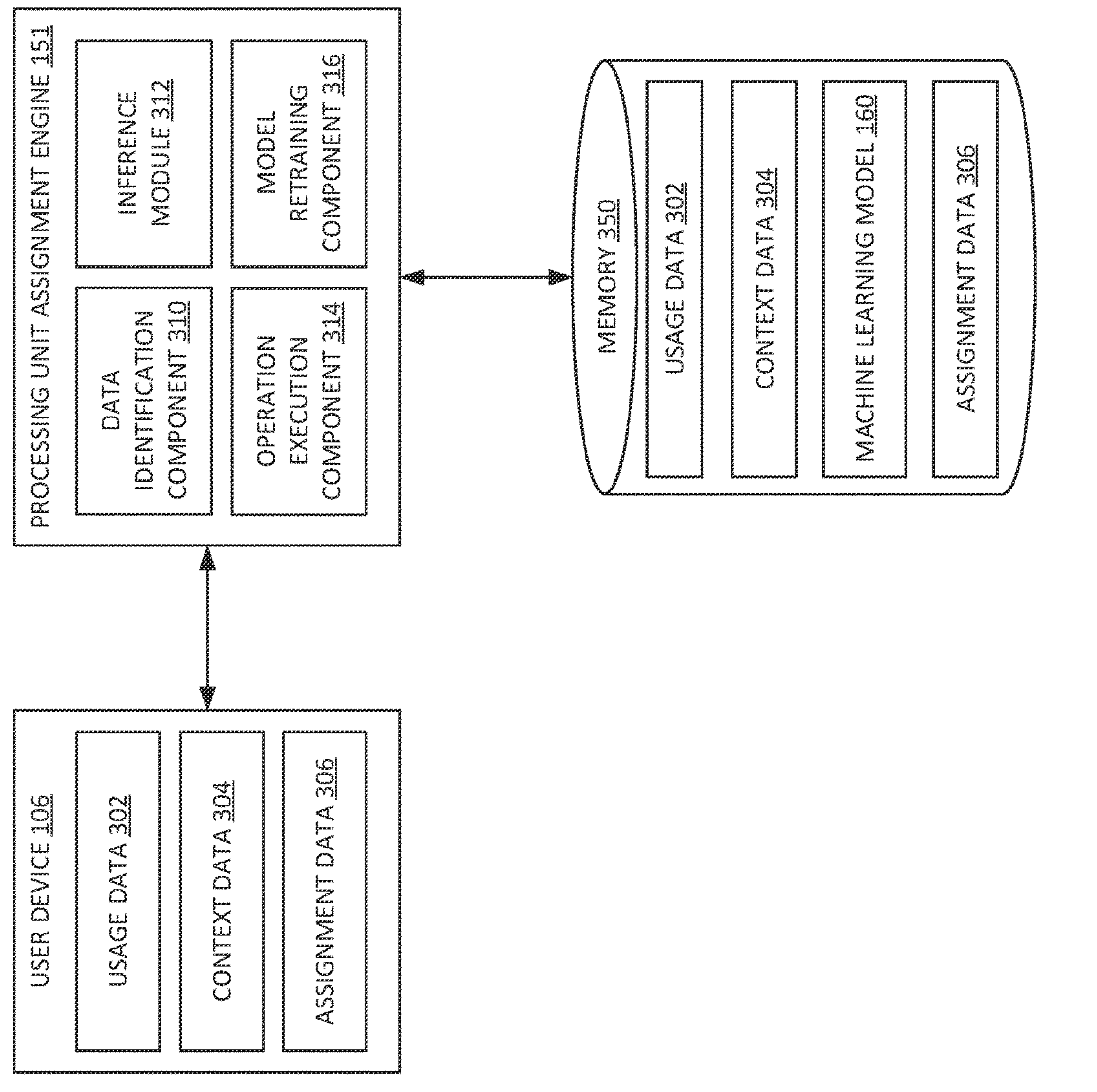
FIG. 3 is a block diagram of an example processing unit assignment engine, according to at least one embodiment.

FIG. 3 is a block diagram of an example processing unit assignment engine 151, according to at least one embodiment. As illustrated in FIG. 3, processing unit assignment engine 151 can include a data identification component 310, an inference module 312, an operation execution component 314, and/or a model retraining component 316. In some embodiments, processing unit assignment engine 151 can reside at user device 106. In other or similar embodiments, processing unit assignment engine 151 can reside at computing device 102 and/or server machine 150. In such embodiments, user device 106 can provide data to and receive data from processing unit assignment engine 151 via network 110 of FIG. 1. Processing unit assignment engine 151 can be connected to a memory 350. In some embodiments, memory 250 can include one or more regions of memory 216 and/or memory 224 of user device 106 (e.g., as illustrated in FIG. 2). In other or similar embodiments, memory 350 can include one or more regions of data store 112. In yet other or similar embodiments, memory 350 can include regions of other memory that is accessible to one or more of user device 106, computing device 102, and/or one or more of server machines 130, 140, and/or 150. One or more operations or techniques implemented by processing unit assignment engine are described below with respect to FIG. 4.

Figure 5:
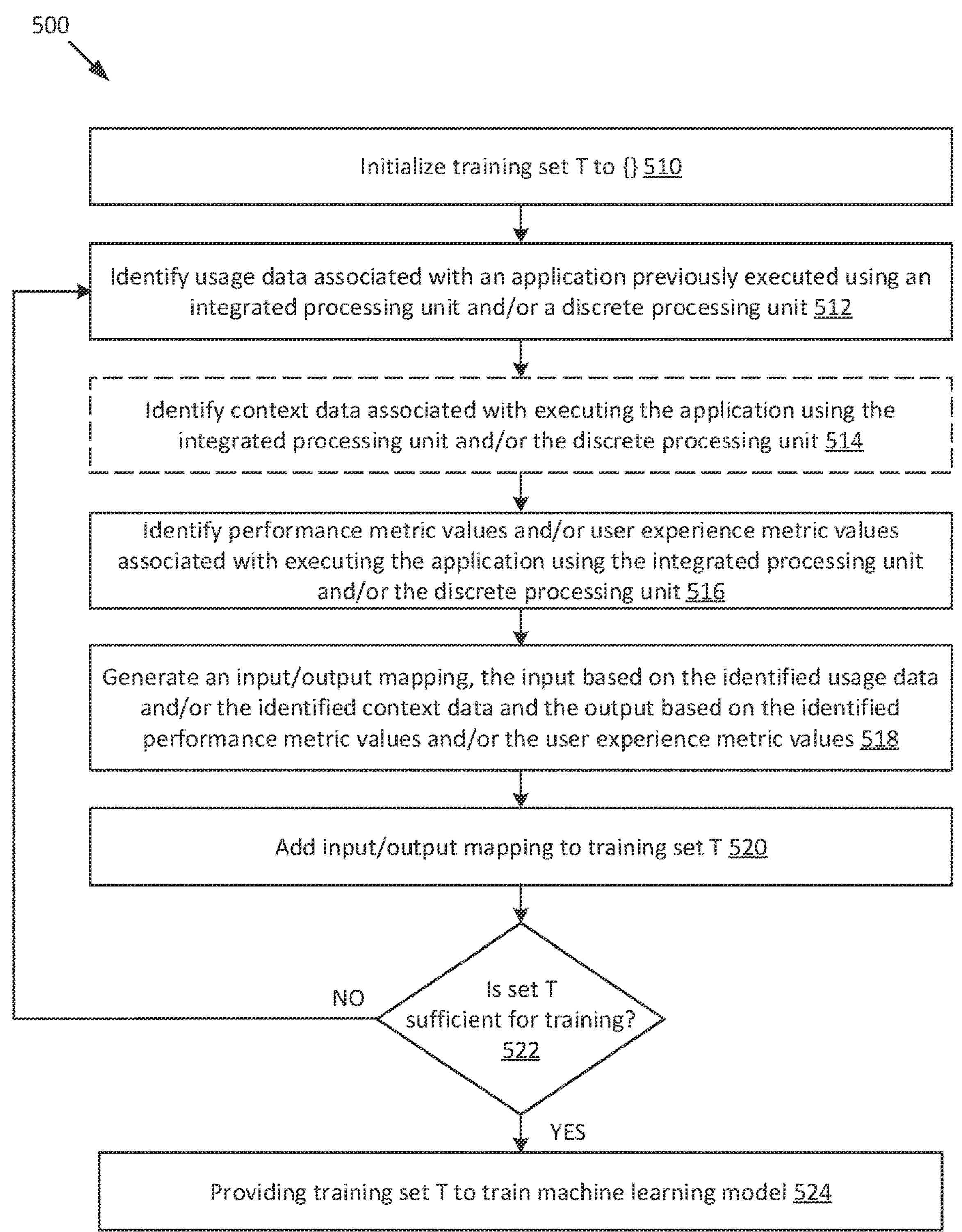
FIG. 5 illustrates a flow diagram of an example method of generating training data for training a machine learning model, according to at least one embodiment.

FIGS. 4 and 5 are flow diagrams of example methods 400 and 500, respectively, which are related to assigning execution of applications to various processing units using machine learning, according to at least some embodiments. In at least one embodiment, methods 400 and 500 may be performed by computing device 102, client device 106, server machine 130, server machine 140, server machine 150, one or more edge devices, one or more endpoint devices, or some other computing device, or a combination of multiple computing devices. Methods 400 and 500 may be performed by one or more processing units (e.g., CPUs and/or GPUs), which may include (or communicate with) one or more memory devices. In at least one embodiment, methods 400 and 500 may be performed by multiple processing threads (e.g., CPU threads and/or GPU threads), each thread executing one or more individual functions, routines, subroutines, or operations of the method. In at least one embodiment, processing threads implementing methods 400 and 500 may be synchronized (e.g., using semaphores, critical sections, and/or other thread synchronization mechanisms). Alternatively, processing threads implementing methods 400 and 500 may be executed asynchronously with respect to each other. Various operations of methods 400 and 500 may be performed in a different order compared with the order shown in FIGS. 4 and 5. Some operations of the methods may be performed concurrently with other operations. In at least one embodiment, one or more operations shown in FIGS. 4 and 5 may not always be performed.

FIG. 4 illustrates a flow diagram of an example method 400 of assigning execution of applications to various processing units using machine learning, according to at least one embodiment, according to at least one embodiment. In some embodiments, one or more operations of method 400 are performed by processing unit assignment engine 151. At block 410, processing logic identifies usage data associated with an application that is to be executed using a computing system. In some embodiments, the computing system can correspond to user device 106, as described herein. Data identification component 310 of processing unit assignment engine 151 can be configured to identify the usage data associated with the application, in some embodiments. As described above, one or more components of user device 106 (e.g., an OS, processing unit assignment engine 151, another component, etc.) can be configured to collect usage data 302 associated with running an application using processing units of user device 106. One or more processing units of user device 106 can be integrated processing units (e.g., GPU(s) 214) or discrete or dedicated processing units (e.g., GPU(s) 222). As described with respect to FIG. 2, the one or more components of user device 106 can collect usage data 302 for the application by determining which features (e.g., processing heavy features, non-processing heavy features, etc.) of the application a user of user device 106 is accessing, in some embodiments. In other or similar embodiments, the one or more components of user device 106 can collect usage data 302 by providing a notification to the user of user device 106 inquiring which features of the application the user plans to access. Usage data 302 can additionally or alternatively include telemetry data collected by one or more utilization sensors of GPU(s) 214 and/or GPU(s) 222, in some embodiments. The telemetry data can be collected for the application that is to be run using the user device 106 or another application that was previously run using the user device 106, as described herein. In an illustrative example, utilization sensors of GPU(s) 214 and/or GPU(s) 222 can collect utilization data prior to or during execution of operations of the application using GPU(s) 214 and/or GPU(s) 222, as described above, which can be stored (e.g., at memory 216 and/or memory 224) as telemetry data. Data identification component 310 can identify usage data 302 at memory 216 and/or memory 224 of user device 106, in some embodiments. In additional or alternative embodiments, user device 106 can provide usage data 302 to data identification component 310 (e.g., via network 110). Usage data 302 can be stored at memory 350, as illustrated in FIG. 3.

In some embodiments, data identification component 310 can further identify context data 304 associated with user device 106. As described above, the context data can be collected (e.g., by the OS of user device 106, by processing unit assignment engine 151, by another component of user device 106, etc.) during a time period during which an application is not running using client device 106. For example, processing unit assignment engine 151 can determine that a user of user device 106 has requested to initialize and/or instantiate the application to be run using user device 106. The OS of user device 106, processing unit assignment engine 151, and/or the other component of user device 106 can collect context data 304 associated with GPU(s) 214 and/or GPU(s) 222 and store the collected context data 304 at memory 216 and/or memory 224. Data identification component 310 can identify context data 304 at memory 216 and/or memory 224, in some embodiments. In additional or alternative embodiments, user device 106 can provide context data 304 to processing unit assignment engine 151 (e.g., via network 110). Context data 304 can be stored at memory 305, as illustrated in FIG. 3.

Referring back to FIG. 4, at block 412, processing logic provides the usage data as input to a machine learning model trained to predict values for system performance metrics and/or user experience metrics associated with executing the application using an integrated processing unit (e.g., one or more of GPU(s) 214) and a discrete processing unit (e.g., one or more of GPU(s) 222) of the computing system. Inference module 312 of processing unit assignment engine 151 may provide the usage data 302 as input to ML model 160, in some embodiments. ML model 160 may be trained to predict the values for system performance metrics and/or user experience metrics using data generated by training engine generator 131, in accordance with embodiments described with respect to FIG. 5.

As indicated above, processing unit assignment engine 151 can reside at user device 106. In some embodiments, one or more portions of ML model 160 can be stored at memory 216 and/or memory 224 of user device 106. Inference module 312 of processing unit assignment engine 151 can provide the usage data 302 identified by data identification component 310 (e.g., at memory 216 and/or memory 224) as input to the one or more portions of ML model 160, in some embodiments. In other or similar embodiments, ML model 160 may reside at another memory of system 100 (e.g., data store 112, memory for an inference server, such as server machine 150, etc.), inference module 312 (e.g., at user device 106) can provide usage data 302 to a computing device or system that is hosting ML model 160 (e.g., computing device 102, server machine 150, etc.) via network 110 to be fed to ML model 160 as an input. In other or similar embodiments, processing unit assignment engine 151 can reside at computing device 102 and/or server machine 150. Inference module 312 can provide the usage data 302 identified by data identification component 310 (e.g., at computing device 102 and/or server machine 150) as input to ML model 160, as described above.

In some embodiments, ML model 160 may be trained to predict the system performance metric values and/or the user experience metric values based on given usage data. In additional or alternative embodiments, ML model 160 may be trained to predict the system performance metric values and/or the user experience metric values based on given usage data and given context data associated with user device 106. In such embodiments, inference module 312 can provide both usage data 302 and context data 304 (e.g., identified by data identification component 310) as input to ML model 160, in accordance with embodiments described above.

Referring back to FIG. 4, processing logic extracts data from one or more outputs of the machine learning model. The extracted data can include a first performance metric value and/or a first user experience metric value associated with executing operations of the application using the integrated processing unit (e.g., one or more of GPU(s) 214) of the computing system (e.g., user device 106). The extracted data can additionally or alternatively include a second performance metric value and/or a second user experience metric value associated with executing operations of the application using the discrete processing unit (e.g., one or more of GPU(s) 222) of the computing system (e.g., user device 106).

Inference module 312 can obtain one or more outputs of ML model 160. As described above, one or more portions of ML model 160 can run on user device 106, in some embodiments. Inference module 312 can obtain the one or more outputs of portions of ML model 160 running on user device 106. In other or similar embodiments, ML model 160 can run on computing device 102 and/or server machine 150. Inference module 312 can obtain the one or more outputs of ML model 160 running on computing device 102 and/or server machine 150. In some embodiments, the one or more outputs of ML model 160 can include performance metric data and/or user experience data. The performance metric data can include one or more sets of first performance metric values and one or more sets of second performance metric values. The performance metric data can further include, for each of the sets of first performance metric data, an indication of a level of confidence that a respective set of first performance metric data corresponds to running the application (or operations of the application) using an integrated processing unit (e.g., GPU(s) 214). The performance metric data can further include, for each of the second sets of performance metric data, an indication of a level of confidence that a respective set of second performance metric data corresponds to running the application (or operations of the application) using a discrete processing unit (e.g., GPU(s) 222).

In additional or alternative embodiments, the user experience data can include one or more sets of first user experience metric values and one or more sets of second user experience metric values. The user experience data can further include, for each of the sets of first user experience metric data, an indication of a level of confidence that a respective set of first user experience metric data corresponds to running the application (or operations of the application) using the integrated processing unit. The user experience data can further include, for each of the sets of second user experience metric data, an indication of a level of confidence that a respective set of second user experience metric data corresponds to running the application (or operations of the application) using the integrated processing unit.

In some embodiments, inference module 312 can determine at least a first performance metric value and/or a first user experience value that corresponds to running the application (or operations of the application) using the integrated processing unit and at least a second performance metric value and/or a second user experience value that corresponds to running the application (or operations of the application) using the discrete processing unit. In an illustrative example, inference module 312 can identify a set of first system performance metric values associated with a level of confidence that satisfies a confidence criterion. A level of confidence can satisfy a confidence criterion if the level of confidence exceeds a level of confidence threshold and/or is higher than levels of confidence for other sets of metric values, in some embodiments. The first system performance metric value can be included in the identified set. Inference module 312 can identify the first user experience metric value, the second system experience metric value and/or the second user experience metric value according to the same or similar techniques used to determine the first system performance metric value (e.g., by identifying a respective set having a level of confidence that satisfies the confidence criterion).

Referring back to FIG. 4, at block 416, processing logic causes at least a portion of the operations of the application to be executed via the integrated processing unit or the discrete processing unit in view of the first performance metric value and/or the first user experience metric value and the second performance metric value and/or the second user experience metric value. In some embodiments, operation execution component 314 can determine whether the application (or particular operations of the application) are to be run using an integrated processing unit (e.g., one or more of GPU(s) 214) and/or using a discrete processing unit (e.g., one or more of GPU(s) 222) based on the first performance metric value and/or the first user experience metric value and the second performance metric value and/or the second user experience metric value (e.g., determined by inference module 312). Operation execution component 314 can determine that the application (or operations of the application) is to be executed via the integrated processing unit in response to determining that a first performance metric value and/or a first user experience metric value satisfy one or more application processing criteria (e.g., a minimal processing efficiency threshold, a minimal number of clock cycles consumption threshold, a system temperature criteria, a maximum number of glitches or errors threshold, etc.). In additional or alternative embodiments, operation execution component 314 can determine that the application (or operations of the application) is to be executed using the discrete processing unit in response to determining that the first system performance metric value and/or the first user experience metric value do not satisfy the application processing criteria and/or the second performance metric value, and/or the second user experience metric value satisfy the application processing criteria.

In an illustrative example, the performance metric values determined by inference module 312 can each indicate a system efficiency associated with executing the application using GPU(s) 214 and GPU(s) 222, respectively. Additionally or alternatively, the user experience metric values determined by inference module 312 can indicate an amount of power to be consumed by user device 106 while the application is executed using GPU(s) 214 and GPU(s) 222, respectively. Operation execution component 314 can determine that a difference between the amount of power indicated by the first user experience metric value and the amount of power indicated by the second user experience metric value exceeds a threshold difference. Operation execution component 314 can also determine that a system efficiency indicated by the first system performance metric value exceeds a threshold system efficiency (e.g., a minimum system efficiency defined by a specification for user device 106 and/or system 100). Accordingly, operation execution component 314 can assign the application to be executed using GPU(s) 214, in some embodiments.

In some embodiments, operation execution component 314 can generate assignment data 306 indicating one or more operations that are assigned to be executed using GPU(s) 214 and/or GPU(s) 222, in some embodiments. In an illustrative example, the assignment data 306 can indicate that all operations of the application are to be executed using GPU(s) 214 or GPU(s) 222. In another illustrative example, assignment data 306 can indicate particular operations (or types of operations) to be executed using GPU(s) 214 and/or GPU(s) 222. In yet another illustrative example, assignment data 306 can indicate that one or more operations of the application can be executed using either one of GPU(s) 214 or GPU(s) 222 (e.g., such operations are to be executed using which ever processing units are available at the time period of execution).

In some embodiments, operation execution component 314 can provide the assignment data 306 to user device 106. For example, operation execution component 314 can store the assignment data 306 at memory 216 and/or memory 224 of user device 106, as described above. An OS of user device 106 can access the stored assignment data 306 and can execute operations of the application according to the assignment indicated by assignment data 306 (e.g., after initialization or instantiation of the application at user device 106). In another example, operation execution component 314 can store the assignment data 306 at data store 112 with metadata indicating that the assignment data 306 corresponds to the application. Computing device 102 can receive a request to instantiate the application at user device 106, in some embodiments. In response to receiving the request, computing device 102 can obtain the assignment data 306 from data store 112 (e.g., in view of the metadata indicating the assignment data 306 corresponds to the application) and can provide the assignment data 306 to user device 106 before, during, or after initialization and/or instantiation of the application. The OS of user device 106 (or another component of user device 106) can execute operations of the application in accordance with assignment data 306, as described above.

In some embodiments, user device 106 can collect usage data (e.g., telemetry data) and/or context data during execution of the application at processing units of user device 106 (e.g., in accordance with assignment data 306). User device 106 can also collect system performance metric data and/or user experience metric data associated with running the application at user device 106. User device 106 can provide the collected usage data, context data, and/or metric data to processing unit assignment engine 151, as described above. Model retraining component 316 can provide the collected usage data, context data, and/or metric data to training data generator 131 and/or training engine 141 to retrain ML model 160, in accordance with embodiments described herein.

In additional or alternative embodiments, ML model 160 (or another ML model) may be trained to output a designation of whether to use an iGPU or a dGPU for execution of an application, rather than outputting experience metric values. In an illustrative example, processing unit assignment engine 151 can identify usage data associated with an application to be executed using a computing system and can provide the identified usage data as input to the ML model, in accordance with previously described embodiments. In some embodiments, the ML model may be configured to predict a performance of the application and/or user experience using the iGPU and/or the dGPU, as described herein. Processing unit engine 151 can obtain one or more outputs of the machine learning model. The one or more outputs can include a first value indicating a first probability that execution on the iGPU is optimal (e.g., in view of the predicted performance and/or user experience) and a second value indicating a second probability that execution on the dGPU is optimal (e.g., in view of the predicted performance and/or user experience). Processing unit assignment engine 151 can determine which of the first value and the second value indicated by the one or more outputs is larger and can cause the application to be run using the iGPU or the dGPU based on the determination. For example, in response to determining that the first value is larger than the second value, processing unit assignment engine 151 can cause the application to be run using the iGPU. In response to determining that the second value is larger than the first value, processing unit engine 151 can cause the application to be run using the dGPU.

FIG. 5 illustrates a flow diagram of an example method 500 of generating training data for training a machine learning model, according to at least one embodiment. In some embodiments, one or more operations of method 500 may be performed by one or more components or modules of training data generator 131 and/or training engine 141, described herein. At block 510, processing logic initializes a training set T to empty (e.g., { }). At block 512, processing logic identifies usage data associated with an application previously executed using an integrated processing unit and/or a discrete processing unit. In some embodiments, the application may have been previously executing using GPU(s) 214 and/or GPU(s) 222 of user device 106. In other or similar embodiments, the application can run on an integrated processing unit and/or a discrete processing unit of another user device. The usage data can be generated or otherwise obtained by an OS of user device 106, (or another user device) processing unit assignment engine 151, and/or another component of user device 106, as described with respect to FIG. 2. The usage data can include telemetry data generated by one or more utilization sensors of the integrated processing unit and/or the discrete processing unit, as described above. At block 514, processing logic, optionally, identifies context data associated with executing the application using the integrated processing unit and/or the discrete processing unit. The OS of user device 106, processing unit assignment engine 151 and/or another component of user device 106 can generate or otherwise obtain the context data, as described above. In some embodiments, the context data can be obtained prior to or during execution of the application at user device 106. Processing logic can identify the usage data and/or the context data from memory 216 and/or memory 224 of user device 106 and/or from data store 112, as described herein.

At block 516, processing logic identifies performance metric values and/or user experience metric values associated with executing the application using the integrated processing unit and/or the discrete processing unit. As described above, an OS of user device 106, processing unit assignment engine 151, and/or another component of user device 106 can generate or otherwise obtain performance metric data and/or user experience data associated with executing the application using the integrated processing unit (e.g., one or more of GPU(s) 214) and/or the discrete processing unit (e.g., one or more of GPU(S) 222) of user device 106. The performance metric data can include values for one or more system performance metrics collected before, during, or after execution of the application using the integrated processing unit and/or the discrete processing unit. The user experience metric data can include values for one or more user experience metrics collected before, during, or after execution of the application using the integrated processing unit and/or the discrete processing unit. Processing logic can identify the performance metric values and/or the user experience metric values from memory 216 and/or memory 224 of user device 106 and/or from data store 112, as described herein.

At block 518, processing logic generates an input/output mapping. The input is based on the identified usage data and/or the identified context data, in some embodiments. The output is based on the identified performance metric values and/or the user experience metric values, in some embodiments. At block 520, processing logic adds the input/output mapping to training set T. At block 522, processing logic determines whether set T is sufficient for training. In response to processing logic determining that set T is not sufficient for training, method 500 can return to block 512. In response to processing logic determining that set T is sufficient for training, method 500 can proceed to block 524. At block 524, processing logic can provide training set T to train a machine learning model, such as machine learning model 160, as described above.

It should be noted that although embodiments of the present disclosure relate to assigning execution of an application (or operations of an application) using iGPU(s) and dGPU(s) of a system, embodiments of the present disclosure can be applied to assigning execution of the application (or operations of the application) using any type of integrated processing unit and discrete processing unit. Further, embodiments of the present disclosure can be applied to assigning execution of the application (or operations of the application) using any two differing types of processing units of a computing system.

It should be noted that, in some embodiments, processing unit assignment engine 151 can determine whether to run the application using iGPU(s) or dGPU(s) without the application of machine learning. In am illustrative example, system 100 can include a rules based decision engine that is configured to take usage data (e.g., telemetry data) as an input and provide an indication of whether to execute an application using a dGPU or an iGPU as an output. A developer and/or engineer of the manufacturing and/or development environment can provide the rules based engine with (or access to) a set of rules that indicate, for particular values or ranges of values of telemetry data, whether an application should be run using a dGPU or an iGPU. In some embodiments, processing unit assignment engine 151 can provide usage data associated with an application to be executed using a computing system as input to the rules-based engine. The rules-based engine can evaluate telemetry values of the provided usage data in view of the set of rules and can determine, based on the set of rules, whether the application should be run using a dGPU or an iGPU. Processing unit assignment engine 151 can obtain one or more outputs of the rules-based engine, which can indicate whether the application is to be run using the dGPU or the iGPU (e.g., based on the determination by the rules-based engine).

Figure 6A:
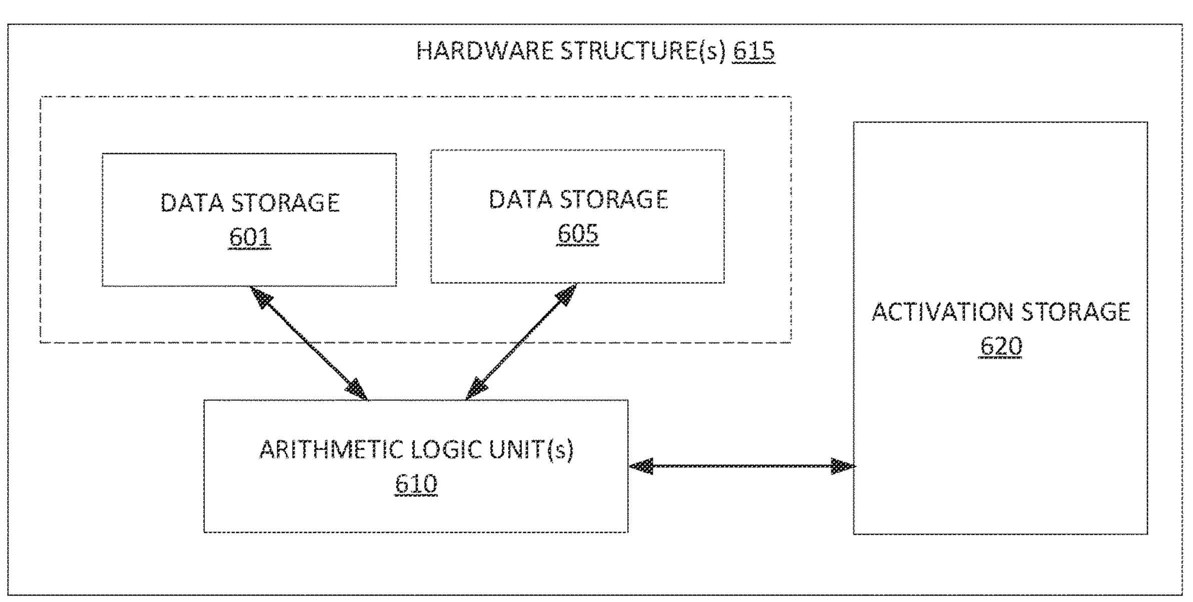
FIG. 6A illustrates inference and/or training logic, according to at least one embodiment.

FIG. 6A illustrates hardware structure(s) 615 for inference and/or training logic used to perform inferencing and/or training operations associated with one or more embodiments. Details regarding inference and/or training logic are provided below in conjunction with FIGS. 6A and/or 6B.

In at least one embodiment, hardware structure(s) 615 may include, without limitation, code and/or data storage 601 to store forward and/or output weight and/or input/output data, and/or other parameters to configure neurons or layers of a neural network trained and/or used for inferencing in aspects of one or more embodiments. In at least one embodiment, training logic may include, or be coupled to code and/or data storage 601 to store graph code or other software to control timing and/or order, in which weight and/or other parameter information is to be loaded to configure, logic, including integer and/or floating point units (collectively, arithmetic logic units (ALUs). In at least one embodiment, code, such as graph code, loads weight or other parameter information into processor ALUs based on an architecture of a neural network to which the code corresponds. In at least one embodiment, code and/or data storage 601 stores weight parameters and/or input/output data of each layer of a neural network trained or used in conjunction with one or more embodiments during forward propagation of input/output data and/or weight parameters during training and/or inferencing using aspects of one or more embodiments. In at least one embodiment, any portion of code and/or data storage 601 may be included with other on-chip or off-chip data storage, including a processor's L1, L2, or L3 cache or system memory.

In at least one embodiment, any portion of code and/or data storage 601 may be internal or external to one or more processors or other hardware logic devices or circuits. In at least one embodiment, code and/or code and/or data storage 601 may be cache memory, dynamic randomly addressable memory ("DRAM"), static randomly addressable memory ("SRAM"), non-volatile memory (e.g., Flash memory), or other storage. In at least one embodiment, choice of whether code and/or code and/or data storage 601 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, hardware structure(s) 615 may include, without limitation, a code and/or data storage 605 to store backward and/or output weight and/or input/output data corresponding to neurons or layers of a neural network trained and/or used for inferencing in aspects of one or more embodiments. In at least one embodiment, code and/or data storage 605 stores weight parameters and/or input/output data of each layer of a neural network trained or used in conjunction with one or more embodiments during backward propagation of input/output data and/or weight parameters during training and/or inferencing using aspects of one or more embodiments. In at least one embodiment, training logic may include, or be coupled to code and/or data storage 605 to store graph code or other software to control timing and/or order, in which weight and/or other parameter information is to be loaded to configure, logic, including integer and/or floating point units (collectively, arithmetic logic units (ALUs). In at least one embodiment, code, such as graph code, loads weight or other parameter information into processor ALUs based on an architecture of a neural network to which the code corresponds. In at least one embodiment, any portion of code and/or data storage 605 may be included with other on-chip or off-chip data storage, including a processor's L1, L2, or L3 cache or system memory. In at least one embodiment, any portion of code and/or data storage 605 may be internal or external to on one or more processors or other hardware logic devices or circuits. In at least one embodiment, code and/or data storage 605 may be cache memory, DRAM, SRAM, non-volatile memory (e.g., Flash memory), or other storage. In at least one embodiment, choice of whether code and/or data storage 605 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, code and/or data storage 601 and code and/or data storage 605 may be separate storage structures. In at least one embodiment, code and/or data storage 601 and code and/or data storage 605 may be same storage structure. In at least one embodiment, code and/or data storage 601 and code and/or data storage 605 may be partially same storage structure and partially separate storage structures. In at least one embodiment, any portion of code and/or data storage 601 code and/or data storage 605 may be included with other on-chip or off-chip data storage, including a processor's L1, L2, or L3 cache or system memory.

In at least one embodiment, hardware structure(s) 615 may include, without limitation, one or more arithmetic logic unit(s) ("ALU(s)") 610, including integer and/or floating point units, to perform logical and/or mathematical operations based, at least in part on, or indicated by, training and/or inference code (e.g., graph code), a result of which may produce activations (e.g., output values from layers or neurons within a neural network) stored in an activation storage 620 that are functions of input/output and/or weight parameter data stored in code and/or data storage 601 and/or code and/or data storage 605. In at least one embodiment, activations stored in activation storage 620 are generated according to linear algebraic and or matrix-based mathematics performed by ALU(s) 610 in response to performing instructions or other code, wherein weight values stored in code and/or data storage 605 and/or code and/or data storage 601 are used as operands along with other values, such as bias values, gradient information, momentum values, or other parameters or hyperparameters, any or all of which may be stored in code and/or data storage 605 or code and/or data storage 601 or another storage on or off-chip.

In at least one embodiment, ALU(s) 610 are included within one or more processors or other hardware logic devices or circuits, whereas in another embodiment, ALU(s) 610 may be external to a processor or other hardware logic device or circuit that uses them (e.g., a co-processor). In at least one embodiment, ALUs 610 may be included within a processor's execution units or otherwise within a bank of ALUs accessible by a processor's execution units either within same processor or distributed between different processors of different types (e.g., central processing units, graphics processing units, fixed function units, etc.). In at least one embodiment, code and/or data storage 601, code and/or data storage 605, and activation storage 620 may be on same processor or other hardware logic device or circuit, whereas in another embodiment, they may be in different processors or other hardware logic devices or circuits, or some combination of same and different processors or other hardware logic devices or circuits. In at least one embodiment, any portion of activation storage 620 may be included with other on-chip or off-chip data storage, including a processor's L1, L2, or L3 cache or system memory. Furthermore, inferencing and/or training code may be stored with other code accessible to a processor or other hardware logic or circuit and fetched and/or processed using a processor's fetch, decode, scheduling, execution, retirement and/or other logical circuits.

In at least one embodiment, activation storage 620 may be cache memory, DRAM, SRAM, non-volatile memory (e.g., Flash memory), or other storage. In at least one embodiment, activation storage 620 may be completely or partially within or external to one or more processors or other logical circuits. In at least one embodiment, choice of whether activation storage 620 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors. In at least one embodiment, hardware structure(s) 615 and/or inference and/or training logic illustrated in FIG. 6A may be used in conjunction with an application-specific integrated circuit ("ASIC"), such as Tensorflow® Processing Unit from Google, an inference processing unit (IPU) from Graphcore™, or a Nervana® (e.g., "Lake Crest") processor from Intel Corp. In at least one embodiment, hardware structure(s) and/or inference and/or training logic of FIG. 6A may be used in conjunction with central processing unit ("CPU") hardware, graphics processing unit ("GPU") hardware or other hardware, such as data processing unit ("DPU") hardware, or field programmable gate arrays ("FPGAs").

Figure 6B:
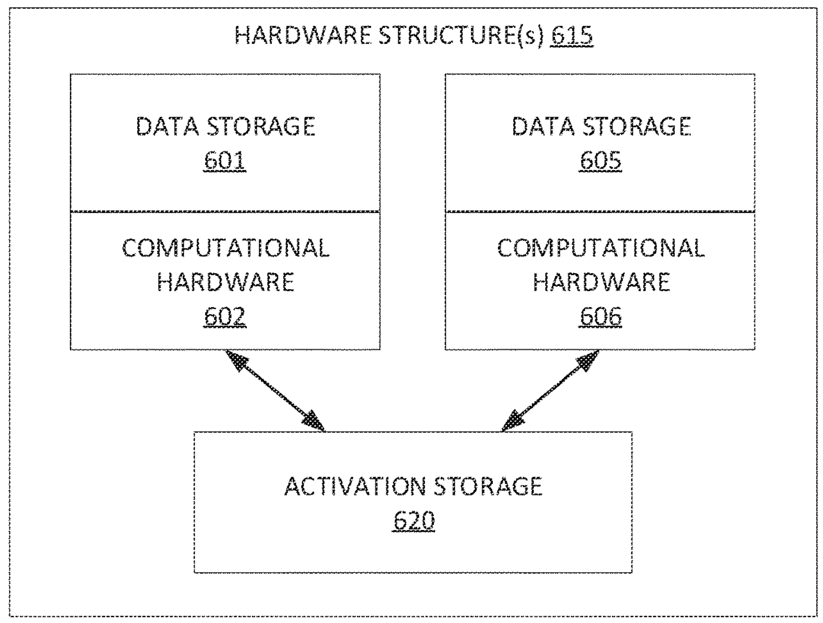
FIG. 6B illustrates inference and/or training logic, according to at least one embodiment.

FIG. 6B illustrates hardware structure(s) 615 for inference and/or training logic, according to at least one or more embodiments. In at least one embodiment, hardware structure(s) 615 may include, without limitation, hardware logic in which computational resources are dedicated or otherwise exclusively used in conjunction with weight values or other information corresponding to one or more layers of neurons within a neural network. In at least one embodiment, hardware structure(s) 615 and/or inference and/or training logic of FIG. 6B may be used in conjunction with an application-specific integrated circuit (ASIC), such as Tensorflow® Processing Unit from Google, an inference processing unit (IPU) from Graphcore™, or a Nervana® (e.g., "Lake Crest") processor from Intel Corp. In at least one embodiment, hardware structure(s) 615 and/or inference and/or training logic of FIG. 6B may be used in conjunction with central processing unit (CPU) hardware, graphics processing unit (GPU) hardware or other hardware, such as data processing unit ("DPU") hardware, or field programmable gate arrays (FPGAs). In at least one embodiment, inference and/or training logic includes, without limitation, code and/or data storage 601 and code and/or data storage 605, which may be used to store code (e.g., graph code), weight values and/or other information, including bias values, gradient information, momentum values, and/or other parameter or hyperparameter information. In at least one embodiment illustrated in FIG. 6B, each of code and/or data storage 601 and code and/or data storage 605 is associated with a dedicated computational resource, such as computational hardware 602 and computational hardware 606, respectively. In at least one embodiment, each of computational hardware 602 and computational hardware 606 comprises one or more ALUs that perform mathematical functions, such as linear algebraic functions, only on information stored in code and/or data storage 601 and code and/or data storage 605, respectively, result of which is stored in activation storage 620.

In at least one embodiment, each of code and/or data storage 601 and 605 and corresponding computational hardware 602 and 606, respectively, correspond to different layers of a neural network, such that resulting activation from one "storage/computational pair 601/602" of code and/or data storage 601 and computational hardware 602 is provided as an input to "storage/computational pair 605/606" of code and/or data storage 605 and computational hardware 606, in order to mirror conceptual organization of a neural network. In at least one embodiment, each of storage/computational pairs 601/602 and 605/606 may correspond to more than one neural network layer. In at least one embodiment, additional storage/computation pairs (not shown) subsequent to or in parallel with storage computation pairs 601/602 and 605/606 may be included in inference and/or training logic.

FIG. 7 illustrates an example data center 700, in which at least one embodiment may be used. In at least one embodiment, data center 700 includes a data center infrastructure layer 710, a framework layer 720, a software layer 730, and an application layer 1240.

In at least one embodiment, as shown in FIG. 7, data center infrastructure layer 710 may include a resource orchestrator 712, grouped computing resources 714, and node computing resources ("node C.R.s") 616(1)-616(N), where "N" represents any whole, positive integer. In at least one embodiment, node C.R.s 616(1)-616(N) may include, but are not limited to, any number of central processing units ("CPUs") or other processors (including accelerators, field programmable gate arrays (FPGAs), data processing units, graphics processors, etc.), memory devices (e.g., dynamic read-only memory), storage devices (e.g., solid state or disk drives), network input/output ("NW I/O") devices, network switches, virtual machines ("VMs"), power modules, and cooling modules, etc. In at least one embodiment, one or more node C.R.s from among node C.R.s 616(1)-616(N) may be a server having one or more of above-mentioned computing resources.

In at least one embodiment, grouped computing resources 714 may include separate groupings of node C.R.s housed within one or more racks (not shown), or many racks housed in data centers at various geographical locations (also not shown). Separate groupings of node C.R.s within grouped computing resources 714 may include grouped compute, network, memory or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 712 may configure or otherwise control one or more node C.R.s 616(1)-616(N) and/or grouped computing resources 714. In at least one embodiment, resource orchestrator 712 may include a software design infrastructure ("SDI") management entity for data center 700. In at least one embodiment, resource orchestrator may include hardware, software or some combination thereof.

In at least one embodiment, as shown in FIG. 7, framework layer 720 includes a job scheduler 722, a configuration manager 724, a resource manager 726 and a distributed file system 728. In at least one embodiment, framework layer 720 may include a framework to support software 732 of software layer 730 and/or one or more application(s) 742 of application layer 740. In at least one embodiment, software 732 or application(s) 742 may respectively include web-based service software or applications, such as those provided by Amazon Web Services, Google Cloud and Microsoft Azure. In at least one embodiment, framework layer 720 may be, but is not limited to, a type of free and open-source software web application framework such as Apache Spark™ (hereinafter "Spark") that may utilize distributed file system 728 for large-scale data processing (e.g., "big data"). In at least one embodiment, job scheduler 722 may include a Spark driver to facilitate scheduling of workloads supported by various layers of data center 700. In at least one embodiment, configuration manager 724 may be capable of configuring different layers such as software layer 730 and framework layer 720 including Spark and distributed file system 728 for supporting large-scale data processing. In at least one embodiment, resource manager 726 may be capable of managing clustered or grouped computing resources mapped to or allocated for support of distributed file system 728 and job scheduler 722. In at least one embodiment, clustered or grouped computing resources may include grouped computing resource 714 at data center infrastructure layer 710. In at least one embodiment, resource manager 726 may coordinate with resource orchestrator 712 to manage these mapped or allocated computing resources.

In at least one embodiment, software 732 included in software layer 730 may include software used by at least portions of node C.R.s 616(1)-616(N), grouped computing resources 714, and/or distributed file system 728 of framework layer 720. The one or more types of software may include, but are not limited to, Internet web page search software, e-mail virus scan software, database software, and streaming video content software.

In at least one embodiment, application(s) 742 included in application layer 740 may include one or more types of applications used by at least portions of node C.R.s 616(1)-616(N), grouped computing resources 714, and/or distributed file system 728 of framework layer 720. One or more types of applications may include, but are not limited to, any number of a genomics application, a cognitive compute, and a machine learning application, including training or inferencing software, machine learning framework software (e.g., PyTorch, TensorFlow, Caffe, etc.) or other machine learning applications used in conjunction with one or more embodiments.

In at least one embodiment, any of configuration manager 724, resource manager 726, and resource orchestrator 712 may implement any number and type of self-modifying actions based on any amount and type of data acquired in any technically feasible fashion. In at least one embodiment, self-modifying actions may relieve a data center operator of data center 700 from making possibly bad configuration decisions and possibly avoiding underutilized and/or poor performing portions of a data center.

In at least one embodiment, data center 700 may include tools, services, software, or other resources to train one or more machine learning models or predict or infer information using one or more machine learning models according to one or more embodiments described herein. For example, in at least one embodiment, a machine learning model may be trained by calculating weight parameters according to a neural network architecture using software and computing resources described above with respect to data center 700. In at least one embodiment, trained machine learning models corresponding to one or more neural networks may be used to infer or predict information using resources described above with respect to data center 700 by using weight parameters calculated through one or more training techniques described herein.

In at least one embodiment, data center may use CPUs, application-specific integrated circuits (ASICs), GPUs, DPUs FPGAs, or other hardware to perform training and/or inferencing using above-described resources. Moreover, one or more software and/or hardware resources described above may be configured as a service to allow users to train or performing inferencing of information, such as image recognition, speech recognition, or other artificial intelligence services.

Inference and/or training logic are used to perform inferencing and/or training operations associated with one or more embodiments. Details regarding inference and/or training logic are provided in conjunction with FIGS. 6A and/or 6B. In at least one embodiment, inference and/or training logic may be used in system FIG. 7 for inferencing or predicting operations based, at least in part, on weight parameters calculated using neural network training operations, neural network functions and/or architectures, or neural network use cases described herein.

Such components may be used to generate synthetic data imitating failure cases in a network training process, which may help to improve performance of the network while limiting the amount of synthetic data to avoid overfitting.

Figure 8:
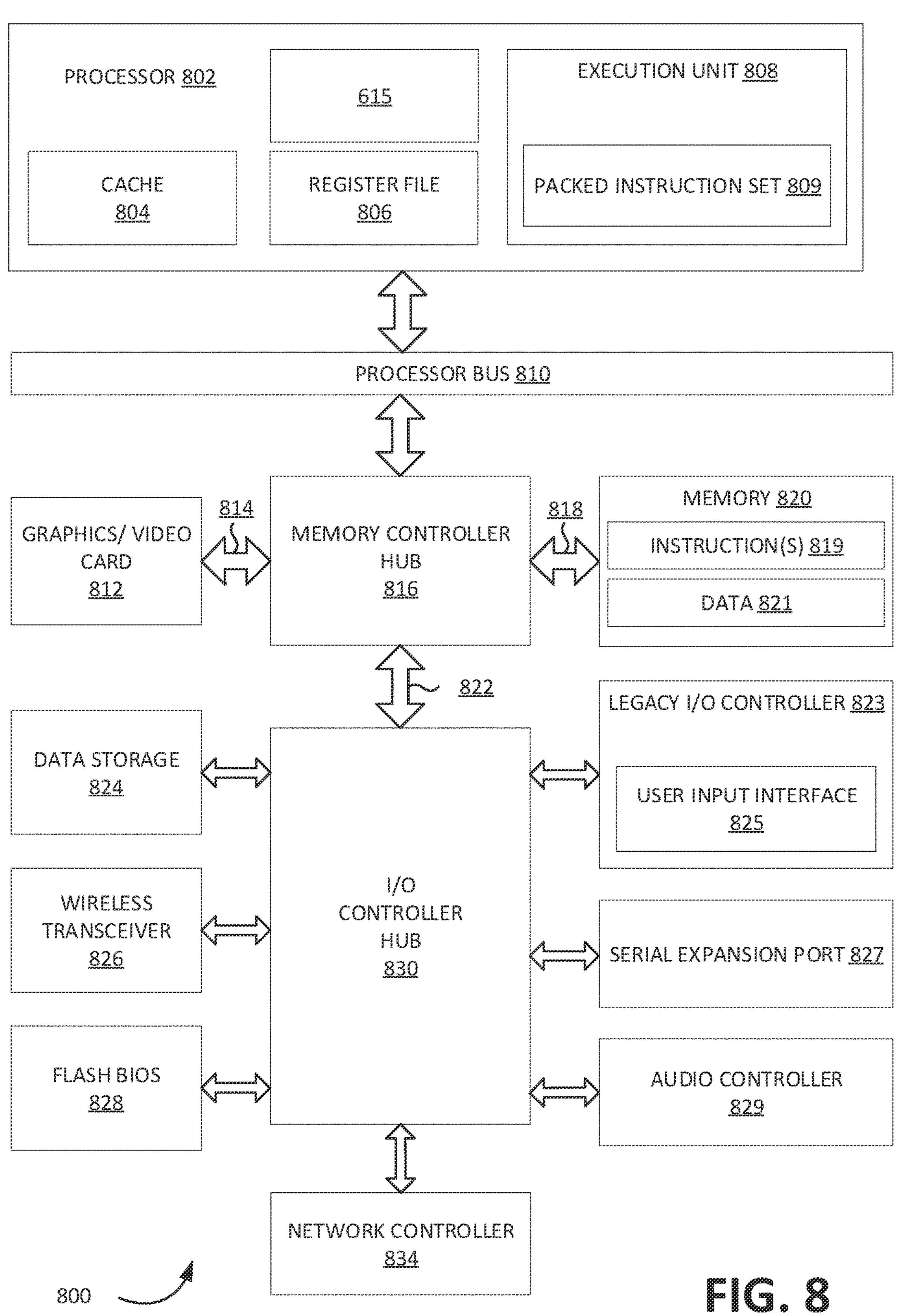
FIG. 8 illustrates a computer system, according to at least one embodiment.

FIG. 8 is a block diagram illustrating an exemplary computer system, which may be a system with interconnected devices and components, a system-on-a-chip (SOC) or some combination thereof 800 formed with a processor that may include execution units to execute an instruction, according to at least one embodiment. In at least one embodiment, computer system 800 may include, without limitation, a component, such as a processor 802 to employ execution units including logic to perform algorithms for process data, in accordance with present disclosure, such as in embodiment described herein. In at least one embodiment, computer system 800 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 800 may execute a version of WINDOWS' operating system available from Microsoft Corporation of Redmond, Wash., although other operating systems (UNIX and Linux for example), embedded software, and/or graphical user interfaces, may also be used.

Embodiments may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor ("DSP"), system on a chip, network computers ("NetPCs"), set-top boxes, network hubs, wide area network ("WAN") switches, edge devices, Internet-of-Things ("IoT") devices, or any other system that may perform one or more instructions in accordance with at least one embodiment.

In at least one embodiment, computer system 800 may include, without limitation, processor 802 that may include, without limitation, one or more execution units 808 to perform machine learning model training and/or inferencing according to techniques described herein. In at least one embodiment, computer system 800 is a single processor desktop or server system, but in another embodiment computer system 800 may be a multiprocessor system. In at least one embodiment, processor 802 may include, without limitation, a complex instruction set computer ("CISC") microprocessor, a reduced instruction set computing ("RISC") microprocessor, a very long instruction word ("VLIW") microprocessor, a processor implementing a combination of instruction sets, or any other processor device, such as a digital signal processor, for example. In at least one embodiment, processor 802 may be coupled to a processor bus 810 that may transmit data signals between processor 802 and other components in computer system 800.

In at least one embodiment, processor 802 may include, without limitation, a Level 1 ("L1") internal cache memory ("cache") 804. In at least one embodiment, processor 802 may have a single internal cache or multiple levels of internal cache. In at least one embodiment, cache memory may reside external to processor 802. Other embodiments may also include a combination of both internal and external caches depending on particular implementation and needs. In at least one embodiment, register file 806 may store different types of data in various registers including, without limitation, integer registers, floating point registers, status registers, and instruction pointer register.

In at least one embodiment, execution unit 808, including, without limitation, logic to perform integer and floating point operations, also resides in processor 802. In at least one embodiment, processor 802 may also include a microcode ("ucode") read only memory ("ROM") that stores microcode for certain macro instructions. In at least one embodiment, execution unit 808 may include logic to handle a packed instruction set 809. In at least one embodiment, by including packed instruction set 809 in an instruction set of a general-purpose processor 802, along with associated circuitry to execute instructions, operations used by many multimedia applications may be performed using packed data in a general-purpose processor 802. In one or more embodiments, many multimedia applications may be accelerated and executed more efficiently by using full width of a processor's data bus for performing operations on packed data, which may eliminate need to transfer smaller units of data across processor's data bus to perform one or more operations one data element at a time.

In at least one embodiment, execution unit 808 may also be used in microcontrollers, embedded processors, graphics devices, DSPs, and other types of logic circuits. In at least one embodiment, computer system 800 may include, without limitation, a memory 820. In at least one embodiment, memory 820 may be implemented as a Dynamic Random Access Memory ("DRAM") device, a Static Random Access Memory ("SRAM") device, flash memory device, or other memory device. In at least one embodiment, memory 820 may store instruction(s) 819 and/or data 821 represented by data signals that may be executed by processor 802.

In at least one embodiment, system logic chip may be coupled to processor bus 810 and memory 820. In at least one embodiment, system logic chip may include, without limitation, a memory controller hub ("MCH") 816, and processor 802 may communicate with MCH 816 via processor bus 810. In at least one embodiment, MCH 816 may provide a high bandwidth memory path 818 to memory 820 for instruction and data storage and for storage of graphics commands, data and textures. In at least one embodiment, MCH 816 may direct data signals between processor 802, memory 820, and other components in computer system 800 and to bridge data signals between processor bus 810, memory 820, and a system I/O 822. In at least one embodiment, system logic chip may provide a graphics port for coupling to a graphics controller. In at least one embodiment, MCH 816 may be coupled to memory 820 through a high bandwidth memory path 818 and graphics/video card 812 may be coupled to MCH 816 through an Accelerated Graphics Port ("AGP") interconnect 814.

In at least one embodiment, computer system 800 may use system I/O 822 that is a proprietary hub interface bus to couple MCH 816 to I/O controller hub ("ICH") 830. In at least one embodiment, ICH 830 may provide direct connections to some I/O devices via a local I/O bus. In at least one embodiment, local I/O bus may include, without limitation, a high-speed I/O bus for connecting peripherals to memory 820, chipset, and processor 802. Examples may include, without limitation, an audio controller 829, a firmware hub ("flash BIOS") 828, a wireless transceiver 826, a data storage 824, a legacy I/O controller 823 containing user input and keyboard interfaces 825, a serial expansion port 827, such as Universal Serial Bus ("USB"), and a network controller 834, which may include in some embodiments, a data processing unit. Data storage 824 may comprise a hard disk drive, a floppy disk drive, a CD-ROM device, a flash memory device, or other mass storage device.

In at least one embodiment, FIG. 8 illustrates a system, which includes interconnected hardware devices or "chips," whereas in other embodiments, FIG. 8 may illustrate an exemplary System on a Chip ("SoC"). In at least one embodiment, devices may be interconnected with proprietary interconnects, standardized interconnects (e.g., PCIe) or some combination thereof. In at least one embodiment, one or more components of computer system 800 are interconnected using compute express link (CXL) interconnects.

Inference and/or training logic 615 are used to perform inferencing and/or training operations associated with one or more embodiments. Details regarding inference and/or training logic 615 are provided below in conjunction with FIGS. 6A and/or 6B. In at least one embodiment, inference and/or training logic 615 may be used in system FIG. 8 for inferencing or predicting operations based, at least in part, on weight parameters calculated using neural network training operations, neural network functions and/or architectures, or neural network use cases described herein.

Such components may be used to generate synthetic data imitating failure cases in a network training process, which may help to improve performance of the network while limiting the amount of synthetic data to avoid overfitting.

Figure 9:
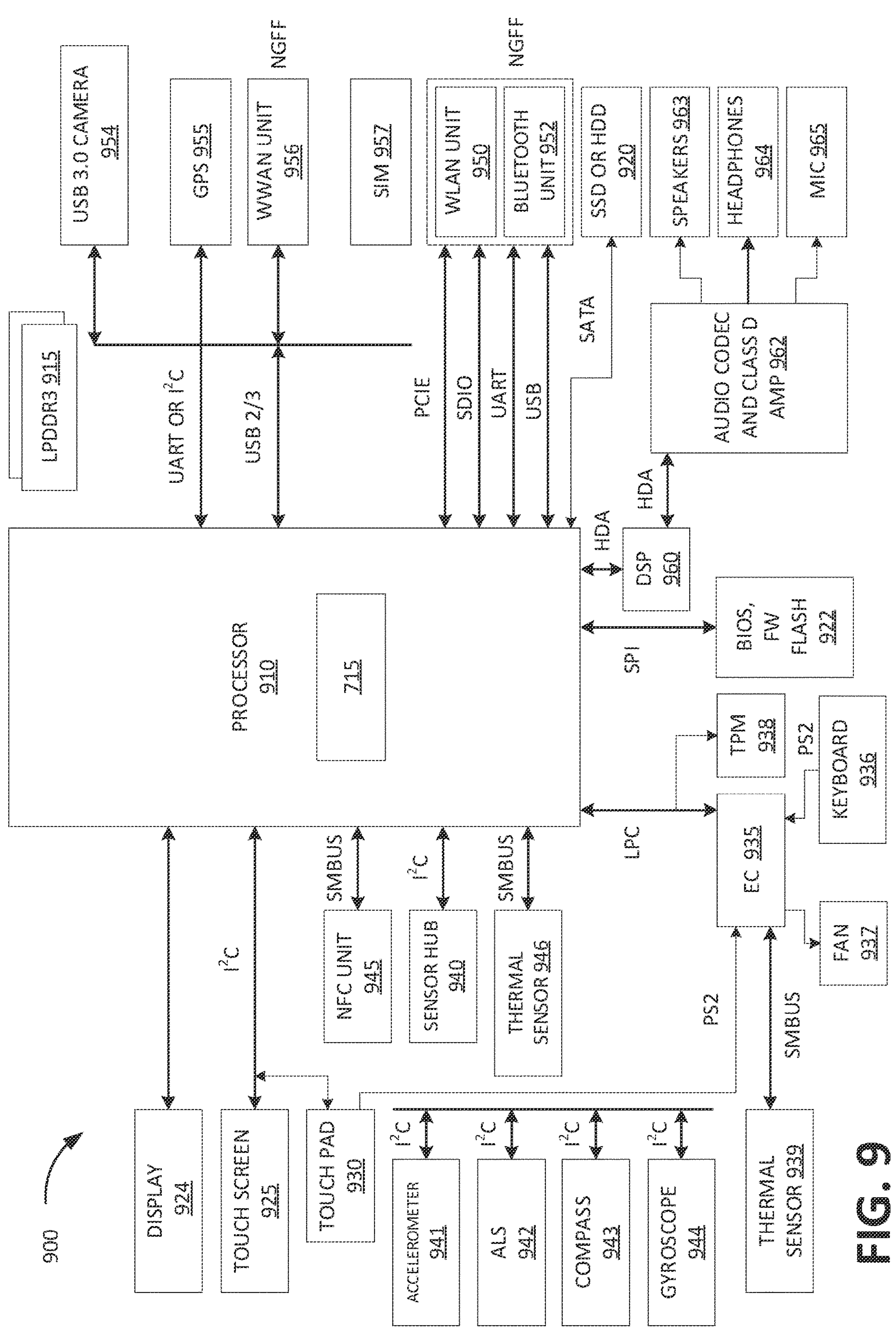
FIG. 9 illustrates a computer system, according to at least one embodiment.

FIG. 9 is a block diagram illustrating an electronic device 900 for utilizing a processor 910, according to at least one embodiment. In at least one embodiment, electronic device 900 may be, for example and without limitation, a notebook, a tower server, a rack server, a blade server, a laptop, a desktop, a tablet, a mobile device, a phone, an embedded computer, an edge device, an IoT device, or any other suitable electronic device.

In at least one embodiment, system 900 may include, without limitation, processor 910 communicatively coupled to any suitable number or kind of components, peripherals, modules, or devices. In at least one embodiment, processor 910 coupled using a bus or interface, such as a 1° C. bus, a System Management Bus ("SMBus"), a Low Pin Count (LPC) bus, a Serial Peripheral Interface ("SPI"), a High Definition Audio ("HDA") bus, a Serial Advance Technology Attachment ("SATA") bus, a Universal Serial Bus ("USB") (versions 1, 2, 3), or a Universal Asynchronous Receiver/Transmitter ("UART") bus. In at least one embodiment, FIG. 9 illustrates a system, which includes interconnected hardware devices or "chips," whereas in other embodiments, FIG. 9 may illustrate an exemplary System on a Chip ("SoC"). In at least one embodiment, devices illustrated in FIG. 9 may be interconnected with proprietary interconnects, standardized interconnects (e.g., PCIe) or some combination thereof. In at least one embodiment, one or more components of FIG. 9 are interconnected using compute express link (CXL) interconnects.

In at least one embodiment, FIG. 9 may include a display 924, a touch screen 925, a touch pad 930, a Near Field Communications unit ("NFC") 945, a sensor hub 940, a thermal sensor 946, an Express Chipset ("EC") 935, a Trusted Platform Module ("TPM") 938, BIOS/firmware/flash memory ("BIOS, FW Flash") 922, a DSP 960, a drive 920 such as a Solid State Disk ("SSD") or a Hard Disk Drive ("HDD"), a wireless local area network unit ("WLAN") 950, a Bluetooth unit 952, a Wireless Wide Area Network unit ("WWAN") 956, a Global Positioning System (GPS) 955, a camera ("USB 3.0 camera") 954 such as a USB 3.0 camera, and/or a Low Power Double Data Rate ("LPDDR") memory unit ("LPDDR3") 915 implemented in, for example, LPDDR3 standard. These components may each be implemented in any suitable manner.

In at least one embodiment, other components may be communicatively coupled to processor 910 through components discussed above. In at least one embodiment, an accelerometer 941, Ambient Light Sensor ("ALS") 942, compass 943, and a gyroscope 944 may be communicatively coupled to sensor hub 940. In at least one embodiment, thermal sensor 939, a fan 937, a keyboard 936, and a touch pad 930 may be communicatively coupled to EC 935. In at least one embodiment, speaker 963, headphones 964, and microphone ("mic") 965 may be communicatively coupled to an audio unit ("audio codec and class d amp") 962, which may in turn be communicatively coupled to DSP 960. In at least one embodiment, audio unit 964 may include, for example and without limitation, an audio coder/decoder ("codec") and a class D amplifier. In at least one embodiment, SIM card ("SIM") 957 may be communicatively coupled to WWAN unit 956. In at least one embodiment, components such as WLAN unit 950 and Bluetooth unit 952, as well as WWAN unit 956 may be implemented in a Next Generation Form Factor ("NGFF").

Inference and/or training logic 615 are used to perform inferencing and/or training operations associated with one or more embodiments. Details regarding inference and/or training logic 615 are provided below in conjunction with FIGS. 6A and/or 6B. In at least one embodiment, inference and/or training logic 615 may be used in system FIG. 9 for inferencing or predicting operations based, at least in part, on weight parameters calculated using neural network training operations, neural network functions and/or architectures, or neural network use cases described herein.

Such components may be used to generate synthetic data imitating failure cases in a network training process, which may help to improve performance of the network while limiting the amount of synthetic data to avoid overfitting.

Figure 10:
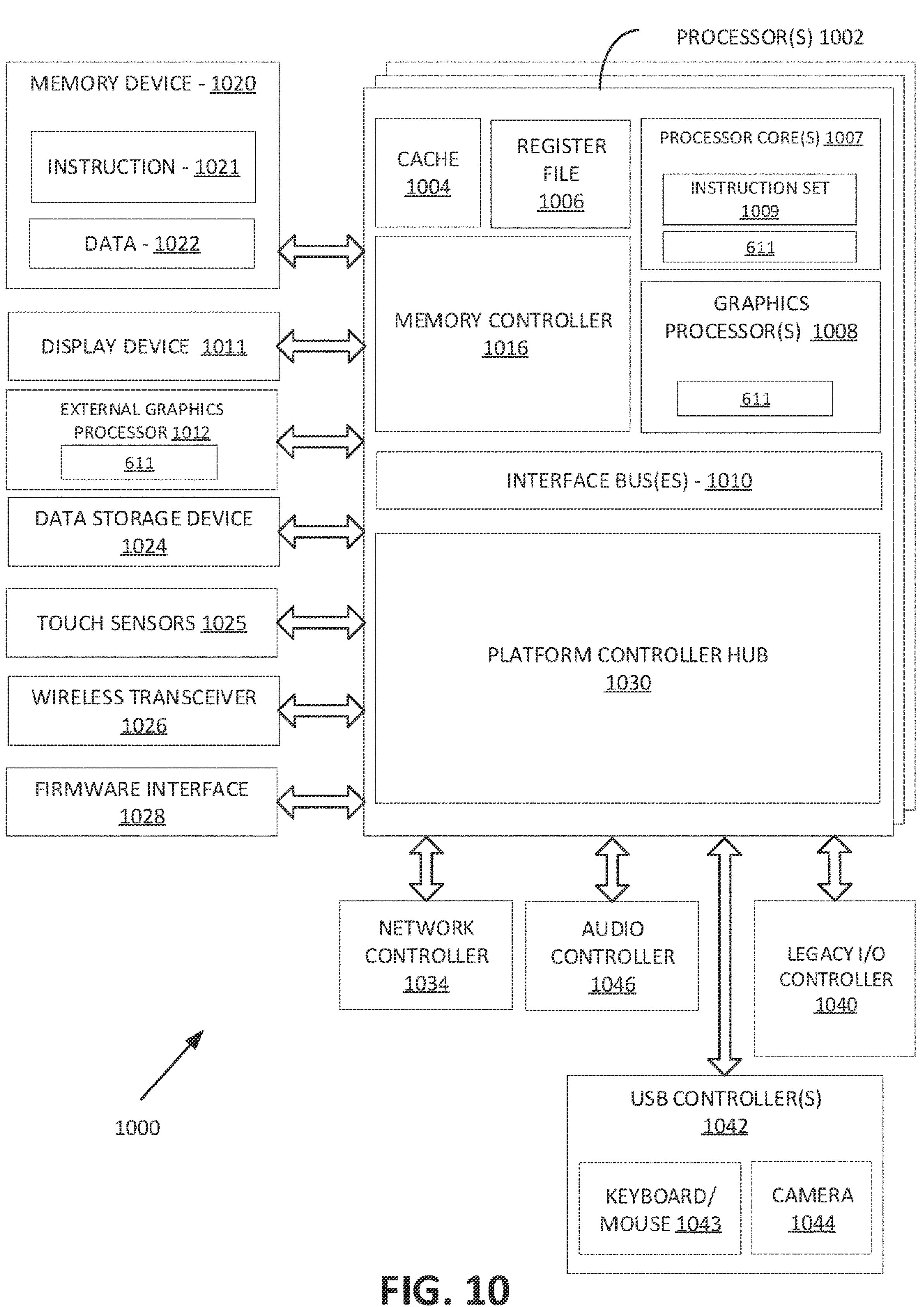
FIG. 10 illustrates at least portions of a graphics processor, according to one or more embodiments.

FIG. 10 is a block diagram of a processing system, according to at least one embodiment. In at least one embodiment, system 1000 includes one or more processors 1002 and one or more graphics processors 1008, and may be a single processor desktop system, a multiprocessor workstation system, or a server system having a large number of processors 1002 or processor cores 1007. In at least one embodiment, system 1000 is a processing platform incorporated within a system-on-a-chip (SoC) integrated circuit for use in mobile, handheld, edge, or embedded devices.

In at least one embodiment, system 1000 may include, or be incorporated within a server-based gaming platform, a game console, including a game and media console, a mobile gaming console, a handheld game console, or an online game console. In at least one embodiment, system 1000 is a mobile phone, smart phone, tablet computing device or mobile Internet device. In at least one embodiment, processing system 1000 may also include, couple with, or be integrated within a wearable device, such as a smart watch wearable device, smart eyewear device, augmented reality device, or virtual reality device. In at least one embodiment, processing system 1000 is a television or set top box device having one or more processors 1002 and a graphical interface generated by one or more graphics processors 1008.

In at least one embodiment, one or more processors 1002 each include one or more processor cores 1007 to process instructions which, when executed, perform operations for system and user software. In at least one embodiment, each of one or more processor cores 1007 is configured to process a specific instruction set 1009. In at least one embodiment, instruction set 1009 may facilitate Complex Instruction Set Computing (CISC), Reduced Instruction Set Computing (RISC), or computing via a Very Long Instruction Word (VLIW). In at least one embodiment, processor cores 1007 may each process a different instruction set 1009, which may include instructions to facilitate emulation of other instruction sets. In at least one embodiment, processor core 1007 may also include other processing devices, such a Digital Signal Processor (DSP).

In at least one embodiment, processor 1002 includes cache memory 1004. In at least one embodiment, processor 1002 may have a single internal cache or multiple levels of internal cache. In at least one embodiment, cache memory is shared among various components of processor 1002. In at least one embodiment, processor 1002 also uses an external cache (e.g., a Level-3 (L3) cache or Last Level Cache (LLC)) (not shown), which may be shared among processor cores 1007 using known cache coherency techniques. In at least one embodiment, register file 1006 is additionally included in processor 1002 which may include different types of registers for storing different types of data (e.g., integer registers, floating point registers, status registers, and an instruction pointer register). In at least one embodiment, register file 1006 may include general-purpose registers or other registers.

In at least one embodiment, one or more processor(s) 1002 are coupled with one or more interface bus(es) 1010 to transmit communication signals such as address, data, or control signals between processor 1002 and other components in system 1000. In at least one embodiment, interface bus 1010, in one embodiment, may be a processor bus, such as a version of a Direct Media Interface (DMI) bus. In at least one embodiment, interface 1010 is not limited to a DMI bus, and may include one or more Peripheral Component Interconnect buses (e.g., PCI, PCI Express), memory busses, or other types of interface busses. In at least one embodiment processor(s) 1002 include an integrated memory controller 1016 and a platform controller hub 1030. In at least one embodiment, memory controller 1016 facilitates communication between a memory device and other components of system 1000, while platform controller hub (PCH) 1030 provides connections to I/O devices via a local I/O bus.

In at least one embodiment, memory device 1020 may be a dynamic random access memory (DRAM) device, a static random access memory (SRAM) device, flash memory device, phase-change memory device, or some other memory device having suitable performance to serve as process memory. In at least one embodiment memory device 1020 may operate as system memory for system 1000, to store data 1022 and instructions 1021 for use when one or more processors 1002 executes an application or process. In at least one embodiment, memory controller 1016 also couples with an optional external graphics processor 1012, which may communicate with one or more graphics processors 1008 in processors 1002 to perform graphics and media operations. In at least one embodiment, a display device 1011 may connect to processor(s) 1002. In at least one embodiment display device 1011 may include one or more of an internal display device, as in a mobile electronic device or a laptop device or an external display device attached via a display interface (e.g., DisplayPort, etc.). In at least one embodiment, display device 1011 may include a head mounted display (HMD) such as a stereoscopic display device for use in virtual reality (VR) applications or augmented reality (AR) applications.

In at least one embodiment, platform controller hub 1030 enables peripherals to connect to memory device 1020 and processor 1002 via a high-speed I/O bus. In at least one embodiment, I/O peripherals include, but are not limited to, an audio controller 1046, a network controller 1034, a firmware interface 1028, a wireless transceiver 1026, touch sensors 1025, a data storage device 1024 (e.g., hard disk drive, flash memory, etc.). In at least one embodiment, data storage device 1024 may connect via a storage interface (e.g., SATA) or via a peripheral bus, such as a Peripheral Component Interconnect bus (e.g., PCI, PCI Express). In at least one embodiment, touch sensors 1025 may include touch screen sensors, pressure sensors, or fingerprint sensors. In at least one embodiment, wireless transceiver 1026 may be a Wi-Fi transceiver, a Bluetooth transceiver, or a mobile network transceiver such as a 3G, 4G, or Long Term Evolution (LTE) transceiver. In at least one embodiment, firmware interface 1028 enables communication with system firmware, and may be, for example, a unified extensible firmware interface (UEFI). In at least one embodiment, network controller 1034 may enable a network connection to a wired network. In at least one embodiment, a high-performance network controller (not shown) couples with interface bus 1010. In at least one embodiment, audio controller 1046 is a multi-channel high definition audio controller. In at least one embodiment, system 1000 includes an optional legacy I/O controller 1040 for coupling legacy (e.g., Personal System 2 (PS/2)) devices to system. In at least one embodiment, platform controller hub 1030 may also connect to one or more Universal Serial Bus (USB) controllers 1042 connect input devices, such as keyboard and mouse 1043 combinations, a camera 1044, or other USB input devices.

In at least one embodiment, an instance of memory controller 1016 and platform controller hub 1030 may be integrated into a discreet external graphics processor, such as external graphics processor 1011. In at least one embodiment, platform controller hub 1030 and/or memory controller 1016 may be external to one or more processor(s) 1002. For example, in at least one embodiment, system 1000 may include an external memory controller 1016 and platform controller hub 1030, which may be configured as a memory controller hub and peripheral controller hub within a system chipset that is in communication with processor(s) 1002.

Inference and/or training logic 615 are used to perform inferencing and/or training operations associated with one or more embodiments. Details regarding inference and/or training logic 615 are provided below in conjunction with FIGS. 6A and/or 6B. In at least one embodiment portions or all of inference and/or training logic 615 may be incorporated into graphics processor 1008. For example, in at least one embodiment, training and/or inferencing techniques described herein may use one or more of ALUs embodied in a graphics processor. Moreover, in at least one embodiment, inferencing and/or training operations described herein may be done using logic other than logic illustrated in FIG. 6A or 6B. In at least one embodiment, weight parameters may be stored in on-chip or off-chip memory and/or registers (shown or not shown) that configure ALUs of a graphics processor to perform one or more machine learning algorithms, neural network architectures, use cases, or training techniques described herein.

Such components may be used to generate synthetic data imitating failure cases in a network training process, which may help to improve performance of the network while limiting the amount of synthetic data to avoid overfitting.

Figure 11:
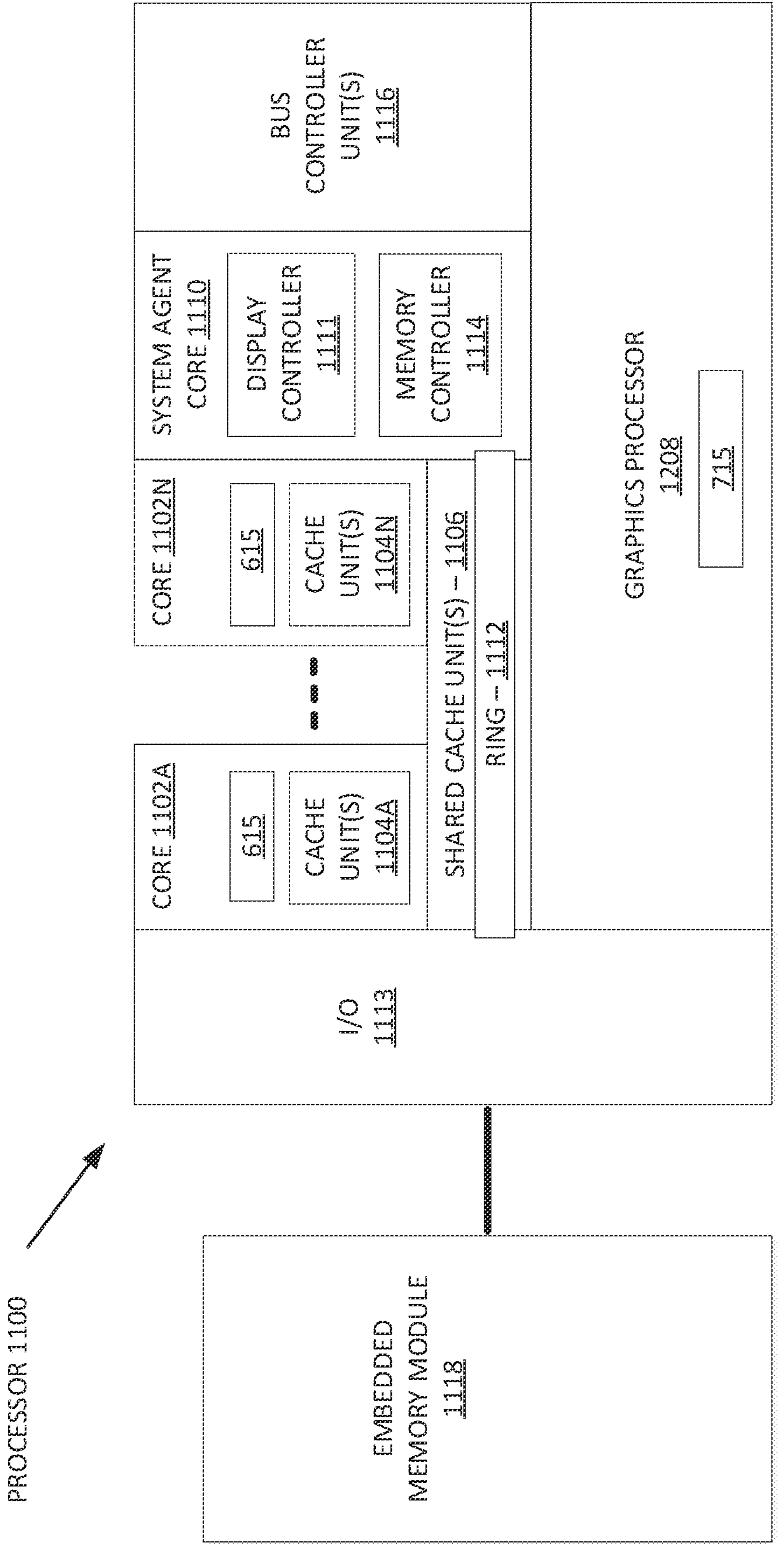
FIG. 11 illustrates at least portions of a graphics processor, according to one or more embodiments.

FIG. 11 is a block diagram of a processor 1100 having one or more processor cores 1102A-1102N, an integrated memory controller 1113, and an integrated graphics processor 1108, according to at least one embodiment. In at least one embodiment, processor 1100 may include additional cores up to and including additional core 1102N represented by dashed lined boxes. In at least one embodiment, each of processor cores 1102A-1102N includes one or more internal cache units 1104A-1104N. In at least one embodiment, each processor core also has access to one or more shared cached units 1106.

In at least one embodiment, internal cache units 1104A-1104N and shared cache units 1106 represent a cache memory hierarchy within processor 1100. In at least one embodiment, cache memory units 1104A-1104N may include at least one level of instruction and data cache within each processor core and one or more levels of shared mid-level cache, such as a Level 2 (L2), Level 3 (L3), Level 4 (L4), or other levels of cache, where a highest level of cache before external memory is classified as an LLC. In at least one embodiment, cache coherency logic maintains coherency between various cache units 1106 and 1104A-1104N.

In at least one embodiment, processor 1100 may also include a set of one or more bus controller units 1116 and a system agent core 1110. In at least one embodiment, one or more bus controller units 1116 manage a set of peripheral buses, such as one or more PCI or PCI express busses. In at least one embodiment, system agent core 1110 provides management functionality for various processor components. In at least one embodiment, system agent core 1110 includes one or more integrated memory controllers 1113 to manage access to various external memory devices (not shown).

In at least one embodiment, one or more of processor cores 1102A-1102N include support for simultaneous multi-threading. In at least one embodiment, system agent core 1110 includes components for coordinating and operating cores 1102A-1102N during multi-threaded processing. In at least one embodiment, system agent core 1110 may additionally include a power control unit (PCU), which includes logic and components to regulate one or more power states of processor cores 1102A-1102N and graphics processor 1108.

In at least one embodiment, processor 1100 additionally includes graphics processor 1108 to execute graphics processing operations. In at least one embodiment, graphics processor 1108 couples with shared cache units 1106, and system agent core 1110, including one or more integrated memory controllers 1113. In at least one embodiment, system agent core 1110 also includes a display controller 1111 to drive graphics processor output to one or more coupled displays. In at least one embodiment, display controller 1111 may also be a separate module coupled with graphics processor 1108 via at least one interconnect, or may be integrated within graphics processor 1108.

In at least one embodiment, a ring based interconnect unit 1112 is used to couple internal components of processor 1100. In at least one embodiment, an alternative interconnect unit may be used, such as a point-to-point interconnect, a switched interconnect, or other techniques. In at least one embodiment, graphics processor 1108 couples with ring interconnect 1112 via an I/O link 1113.

In at least one embodiment, I/O link 1113 represents at least one of multiple varieties of I/O interconnects, including an on package I/O interconnect which facilitates communication between various processor components and a high-performance embedded memory module 1118, such as an eDRAM module. In at least one embodiment, each of processor cores 1102A-1102N and graphics processor 1108 use embedded memory modules 1118 as a shared Last Level Cache.

In at least one embodiment, processor cores 1102A-1102N are homogenous cores executing a common instruction set architecture. In at least one embodiment, processor cores 1102A-1102N are heterogeneous in terms of instruction set architecture (ISA), where one or more of processor cores 1102A-1102N execute a common instruction set, while one or more other cores of processor cores 1102A-1102N executes a subset of a common instruction set or a different instruction set. In at least one embodiment, processor cores 1102A-1102N are heterogeneous in terms of microarchitecture, where one or more cores having a relatively higher power consumption couple with one or more power cores having a lower power consumption. In at least one embodiment, processor 1100 may be implemented on one or more chips or as a SoC integrated circuit.

Inference and/or training logic 615 are used to perform inferencing and/or training operations associated with one or more embodiments. Details regarding inference and/or training logic 615 are provided below in conjunction with FIGS. 6A and/or 6B. In at least one embodiment portions or all of inference and/or training logic 615 may be incorporated into processor 1100. For example, in at least one embodiment, training and/or inferencing techniques described herein may use one or more of ALUs embodied in graphics processor 1108, graphics core(s) 1102A-1102N, or other components in FIG. 11. Moreover, in at least one embodiment, inferencing and/or training operations described herein may be done using logic other than logic illustrated in FIG. 6A or 6B. In at least one embodiment, weight parameters may be stored in on-chip or off-chip memory and/or registers (shown or not shown) that configure ALUs of graphics processor 1100 to perform one or more machine learning algorithms, neural network architectures, use cases, or training techniques described herein.

Such components may be used to generate synthetic data imitating failure cases in a network training process, which may help to improve performance of the network while limiting the amount of synthetic data to avoid overfitting.

Figure 12:
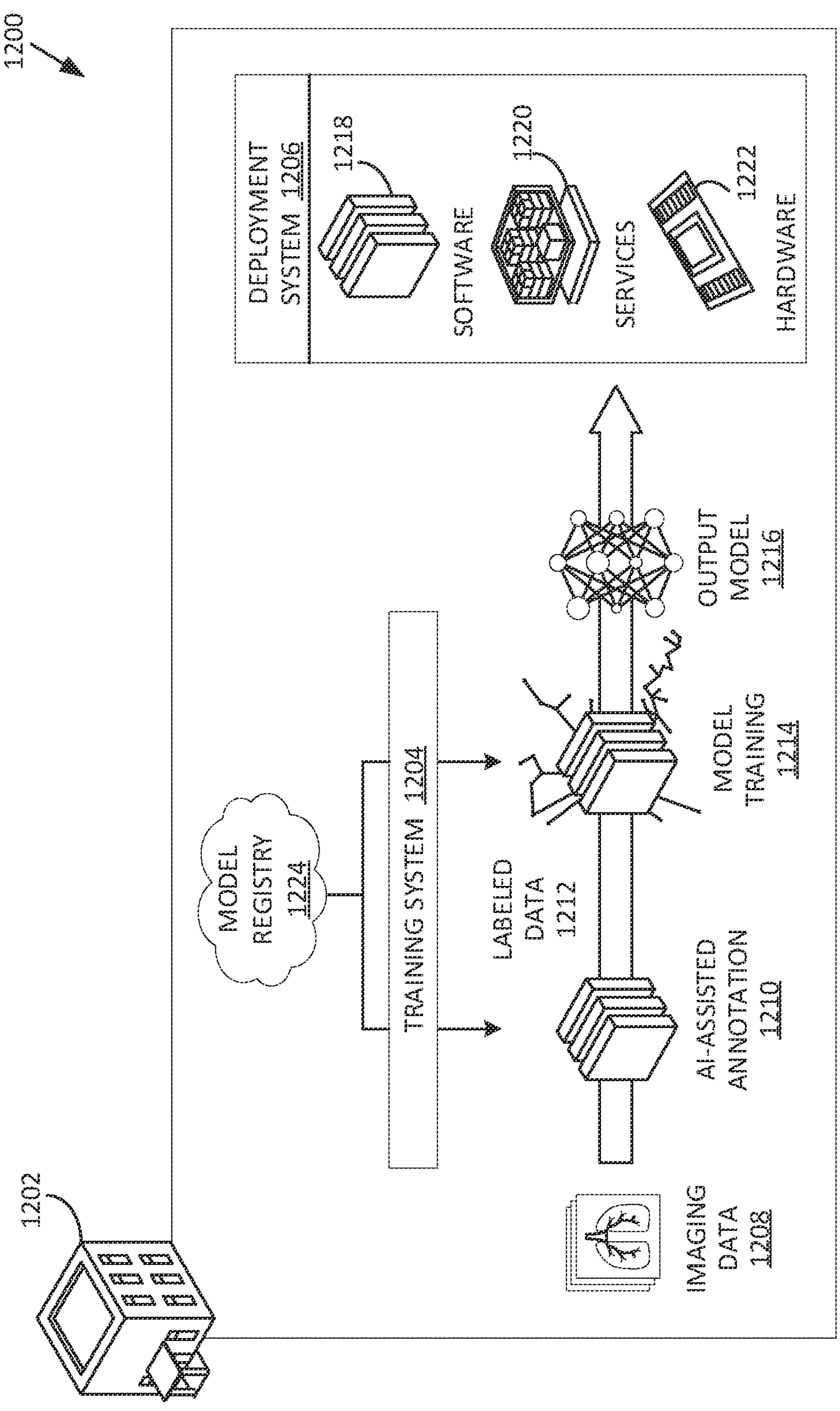
FIG. 12 is an example data flow diagram for an advanced computing pipeline, in accordance with at least one embodiment.

FIG. 12 is an example data flow diagram for a process 1200 of generating and deploying an image processing and inferencing pipeline, in accordance with at least one embodiment. In at least one embodiment, process 1200 may be deployed for use with imaging devices, processing devices, and/or other device types at one or more facilities 1202. Process 1200 may be executed within a training system 1204 and/or a deployment system 1206. In at least one embodiment, training system 1204 may be used to perform training, deployment, and implementation of machine learning models (e.g., neural networks, object detection algorithms, computer vision algorithms, etc.) for use in deployment system 1206. In at least one embodiment, deployment system 1206 may be configured to offload processing and compute resources among a distributed computing environment to reduce infrastructure requirements at facility 1202. In at least one embodiment, one or more applications in a pipeline may use or call upon services (e.g., inference, visualization, compute, AI, etc.) of deployment system 1206 during execution of applications.

In at least one embodiment, some of applications used in advanced processing and inferencing pipelines may use machine learning models or other AI to perform one or more processing steps. In at least one embodiment, machine learning models may be trained at facility 1202 using data 1208 (such as imaging data) generated at facility 1202 (and stored on one or more picture archiving and communication system (PACS) servers at facility 1202), may be trained using imaging or sequencing data 1208 from another facility (ies), or a combination thereof. In at least one embodiment, training system 1204 may be used to provide applications, services, and/or other resources for generating working, deployable machine learning models for deployment system 1206.

In at least one embodiment, model registry 1224 may be backed by object storage that may support versioning and object metadata. In at least one embodiment, object storage may be accessible through, for example, a cloud storage (e.g., cloud 1226 of FIG. 12) compatible application programming interface (API) from within a cloud platform. In at least one embodiment, machine learning models within model registry 1224 may uploaded, listed, modified, or deleted by developers or partners of a system interacting with an API. In at least one embodiment, an API may provide access to methods that allow users with appropriate credentials to associate models with applications, such that models may be executed as part of execution of containerized instantiations of applications.

In at least one embodiment, training pipeline 1204 (FIG. 12) may include a scenario where facility 1202 is training their own machine learning model, or has an existing machine learning model that needs to be optimized or updated. In at least one embodiment, imaging data 1208 generated by imaging device(s), sequencing devices, and/or other device types may be received. In at least one embodiment, once imaging data 1208 is received, AI-assisted annotation 1210 may be used to aid in generating annotations corresponding to imaging data 1208 to be used as ground truth data for a machine learning model. In at least one embodiment, AI-assisted annotation 1210 may include one or more machine learning models (e.g., convolutional neural networks (CNNs)) that may be trained to generate annotations corresponding to certain types of imaging data 1208 (e.g., from certain devices). In at least one embodiment, AI-assisted annotations 1210 may then be used directly, or may be adjusted or fine-tuned using an annotation tool to generate ground truth data. In at least one embodiment, AI-assisted annotations 1210, labeled clinic data 1212, or a combination thereof may be used as ground truth data for training a machine learning model. In at least one embodiment, a trained machine learning model may be referred to as output model 1216, and may be used by deployment system 1206, as described herein.

In at least one embodiment, training pipeline 1204 (FIG. 12) may include a scenario where facility 1202 needs a machine learning model for use in performing one or more processing tasks for one or more applications in deployment system 1206, but facility 1202 may not currently have such a machine learning model (or may not have a model that is optimized, efficient, or effective for such purposes). In at least one embodiment, an existing machine learning model may be selected from a model registry 1224. In at least one embodiment, model registry 1224 may include machine learning models trained to perform a variety of different inference tasks on imaging data. In at least one embodiment, machine learning models in model registry 1224 may have been trained on imaging data from different facilities than facility 1202 (e.g., facilities remotely located). In at least one embodiment, machine learning models may have been trained on imaging data from one location, two locations, or any number of locations. In at least one embodiment, when being trained on imaging data from a specific location, training may take place at that location, or at least in a manner that protects confidentiality of imaging data or restricts imaging data from being transferred off-premises. In at least one embodiment, once a model is trained—or partially trained—at one location, a machine learning model may be added to model registry 1224. In at least one embodiment, a machine learning model may then be retrained, or updated, at any number of other facilities, and a retrained or updated model may be made available in model registry 1224. In at least one embodiment, a machine learning model may then be selected from model registry 1224—and referred to as output model 1216—and may be used in deployment system 1206 to perform one or more processing tasks for one or more applications of a deployment system.

In at least one embodiment, training pipeline 1204 (FIG. 12), a scenario may include facility 1202 requiring a machine learning model for use in performing one or more processing tasks for one or more applications in deployment system 1206, but facility 1202 may not currently have such a machine learning model (or may not have a model that is optimized, efficient, or effective for such purposes). In at least one embodiment, a machine learning model selected from model registry 1224 may not be fine-tuned or optimized for imaging data 1208 generated at facility 1202 because of differences in populations, robustness of training data used to train a machine learning model, diversity in anomalies of training data, and/or other issues with training data. In at least one embodiment, AI-assisted annotation 1210 may be used to aid in generating annotations corresponding to imaging data 1208 to be used as ground truth data for retraining or updating a machine learning model. In at least one embodiment, labeled data 1212 may be used as ground truth data for training a machine learning model. In at least one embodiment, retraining or updating a machine learning model may be referred to as model training 1214. In at least one embodiment, model training 1214—e.g., AI-assisted annotations 1210, labeled clinic data 1212, or a combination thereof—may be used as ground truth data for retraining or updating a machine learning model. In at least one embodiment, a trained machine learning model may be referred to as output model 1216, and may be used by deployment system 1206, as described herein.

In at least one embodiment, deployment system 1206 may include software 1218, services 1220, hardware 1222, and/or other components, features, and functionality. In at least one embodiment, deployment system 1206 may include a software "stack," such that software 1218 may be built on top of services 1220 and may use services 1220 to perform some or all of processing tasks, and services 1220 and software 1218 may be built on top of hardware 1222 and use hardware 1222 to execute processing, storage, and/or other compute tasks of deployment system 1206. In at least one embodiment, software 1218 may include any number of different containers, where each container may execute an instantiation of an application. In at least one embodiment, each application may perform one or more processing tasks in an advanced processing and inferencing pipeline (e.g., inferencing, object detection, feature detection, segmentation, image enhancement, calibration, etc.). In at least one embodiment, an advanced processing and inferencing pipeline may be defined based on selections of different containers that are desired or required for processing imaging data 1208, in addition to containers that receive and configure imaging data for use by each container and/or for use by facility 1202 after processing through a pipeline (e.g., to convert outputs back to a usable data type). In at least one embodiment, a combination of containers within software 1218 (e.g., that make up a pipeline) may be referred to as a virtual instrument (as described in more detail herein), and a virtual instrument may leverage services 1220 and hardware 1222 to execute some or all processing tasks of applications instantiated in containers.

In at least one embodiment, a data processing pipeline may receive input data (e.g., imaging data 1208) in a specific format in response to an inference request (e.g., a request from a user of deployment system 1206). In at least one embodiment, input data may be representative of one or more images, video, and/or other data representations generated by one or more imaging devices. In at least one embodiment, data may undergo pre-processing as part of data processing pipeline to prepare data for processing by one or more applications. In at least one embodiment, post-processing may be performed on an output of one or more inferencing tasks or other processing tasks of a pipeline to prepare an output data for a next application and/or to prepare output data for transmission and/or use by a user (e.g., as a response to an inference request). In at least one embodiment, inferencing tasks may be performed by one or more machine learning models, such as trained or deployed neural networks, which may include output models 1216 of training system 1204.

In at least one embodiment, tasks of data processing pipeline may be encapsulated in a container(s) that each represents a discrete, fully functional instantiation of an application and virtualized computing environment that is able to reference machine learning models. In at least one embodiment, containers or applications may be published into a private (e.g., limited access) area of a container registry (described in more detail herein), and trained or deployed models may be stored in model registry 1224 and associated with one or more applications. In at least one embodiment, images of applications (e.g., container images) may be available in a container registry, and once selected by a user from a container registry for deployment in a pipeline, an image may be used to generate a container for an instantiation of an application for use by a user's system.

In at least one embodiment, developers (e.g., software developers, clinicians, doctors, etc.) may develop, publish, and store applications (e.g., as containers) for performing image processing and/or inferencing on supplied data. In at least one embodiment, development, publishing, and/or storing may be performed using a software development kit (SDK) associated with a system (e.g., to ensure that an application and/or container developed is compliant with or compatible with a system). In at least one embodiment, an application that is developed may be tested locally (e.g., at a first facility, on data from a first facility) with an SDK which may support at least some of services 1220 as a system (e.g., system 1200 of FIG. 12). In at least one embodiment, because DICOM objects may contain anywhere from one to hundreds of images or other data types, and due to a variation in data, a developer may be responsible for managing (e.g., setting constructs for, building pre-processing into an application, etc.) extraction and preparation of incoming data. In at least one embodiment, once validated by system 1200 (e.g., for accuracy), an application may be available in a container registry for selection and/or implementation by a user to perform one or more processing tasks with respect to data at a facility (e.g., a second facility) of a user.

In at least one embodiment, developers may then share applications or containers through a network for access and use by users of a system (e.g., system 1200 of FIG. 12). In at least one embodiment, completed and validated applications or containers may be stored in a container registry and associated machine learning models may be stored in model registry 1224. In at least one embodiment, a requesting entity—who provides an inference or image processing request—may browse a container registry and/or model registry 1224 for an application, container, dataset, machine learning model, etc., select a desired combination of elements for inclusion in data processing pipeline, and submit an imaging processing request. In at least one embodiment, a request may include input data (and associated patient data, in some examples) that is necessary to perform a request, and/or may include a selection of application(s) and/or machine learning models to be executed in processing a request. In at least one embodiment, a request may then be passed to one or more components of deployment system 1206 (e.g., a cloud) to perform processing of data processing pipeline. In at least one embodiment, processing by deployment system 1206 may include referencing selected elements (e.g., applications, containers, models, etc.) from a container registry and/or model registry 1224. In at least one embodiment, once results are generated by a pipeline, results may be returned to a user for reference (e.g., for viewing in a viewing application suite executing on a local, on-premises workstation or terminal).

In at least one embodiment, to aid in processing or execution of applications or containers in pipelines, services 1220 may be leveraged. In at least one embodiment, services 1220 may include compute services, artificial intelligence (AI) services, visualization services, and/or other service types. In at least one embodiment, services 1220 may provide functionality that is common to one or more applications in software 1218, so functionality may be abstracted to a service that may be called upon or leveraged by applications. In at least one embodiment, functionality provided by services 1220 may run dynamically and more efficiently, while also scaling well by allowing applications to process data in parallel (e.g., using a parallel computing platform 1230 (FIG. 12)). In at least one embodiment, rather than each application that shares a same functionality offered by a service 1220 being required to have a respective instance of service 1220, service 1220 may be shared between and among various applications. In at least one embodiment, services may include an inference server or engine that may be used for executing detection or segmentation tasks, as non-limiting examples. In at least one embodiment, a model training service may be included that may provide machine learning model training and/or retraining capabilities. In at least one embodiment, a data augmentation service may further be included that may provide GPU accelerated data (e.g., DICOM, RIS, CIS, REST compliant, RPC, raw, etc.) extraction, resizing, scaling, and/or other augmentation. In at least one embodiment, a visualization service may be used that may add image rendering effects—such as ray-tracing, rasterization, denoising, sharpening, etc.—to add realism to two-dimensional (2D) and/or three-dimensional (3D) models. In at least one embodiment, virtual instrument services may be included that provide for beam-forming, segmentation, inferencing, imaging, and/or support for other applications within pipelines of virtual instruments.

In at least one embodiment, where a service 1220 includes an AI service (e.g., an inference service), one or more machine learning models may be executed by calling upon (e.g., as an API call) an inference service (e.g., an inference server) to execute machine learning model(s), or processing thereof, as part of application execution. In at least one embodiment, where another application includes one or more machine learning models for segmentation tasks, an application may call upon an inference service to execute machine learning models for performing one or more of processing operations associated with segmentation tasks. In at least one embodiment, software 1218 implementing advanced processing and inferencing pipeline that includes segmentation application and anomaly detection application may be streamlined because each application may call upon a same inference service to perform one or more inferencing tasks.

In at least one embodiment, hardware 1222 may include GPUs, CPUs, DPUs, graphics cards, an AI/deep learning system (e.g., an AI supercomputer, such as NVIDIA's DGX), a cloud platform, or a combination thereof. In at least one embodiment, different types of hardware 1222 may be used to provide efficient, purpose-built support for software 1218 and services 1220 in deployment system 1206. In at least one embodiment, use of GPU processing may be implemented for processing locally (e.g., at facility 1202), within an AI/deep learning system, in a cloud system, and/or in other processing components of deployment system 1206 to improve efficiency, accuracy, and efficacy of image processing and generation. In at least one embodiment, software 1218 and/or services 1220 may be optimized for GPU processing with respect to deep learning, machine learning, and/or high-performance computing, as non-limiting examples. In at least one embodiment, at least some of computing environment of deployment system 1206 and/or training system 1204 may be executed in a datacenter one or more supercomputers or high performance computing systems, with GPU optimized software (e.g., hardware and software combination of NVIDIA's DGX System). In at least one embodiment, hardware 1222 may include any number of GPUs that may be called upon to perform processing of data in parallel, as described herein. In at least one embodiment, cloud platform may further include GPU processing for GPU-optimized execution of deep learning tasks, machine learning tasks, or other computing tasks. In at least one embodiment, cloud platform may further include DPU processing to transmit data received over a network and/or through a network controller or other network interface directly to (e.g., a memory of) one or more GPU(s). In at least one embodiment, cloud platform (e.g., NVIDIA's NGC) may be executed using an AI/deep learning supercomputer(s) and/or GPU-optimized software (e.g., as provided on NVIDIA's DGX Systems) as a hardware abstraction and scaling platform. In at least one embodiment, cloud platform may integrate an application container clustering system or orchestration system (e.g., KUBERNETES) on multiple GPUs to enable seamless scaling and load balancing.

Figure 13:
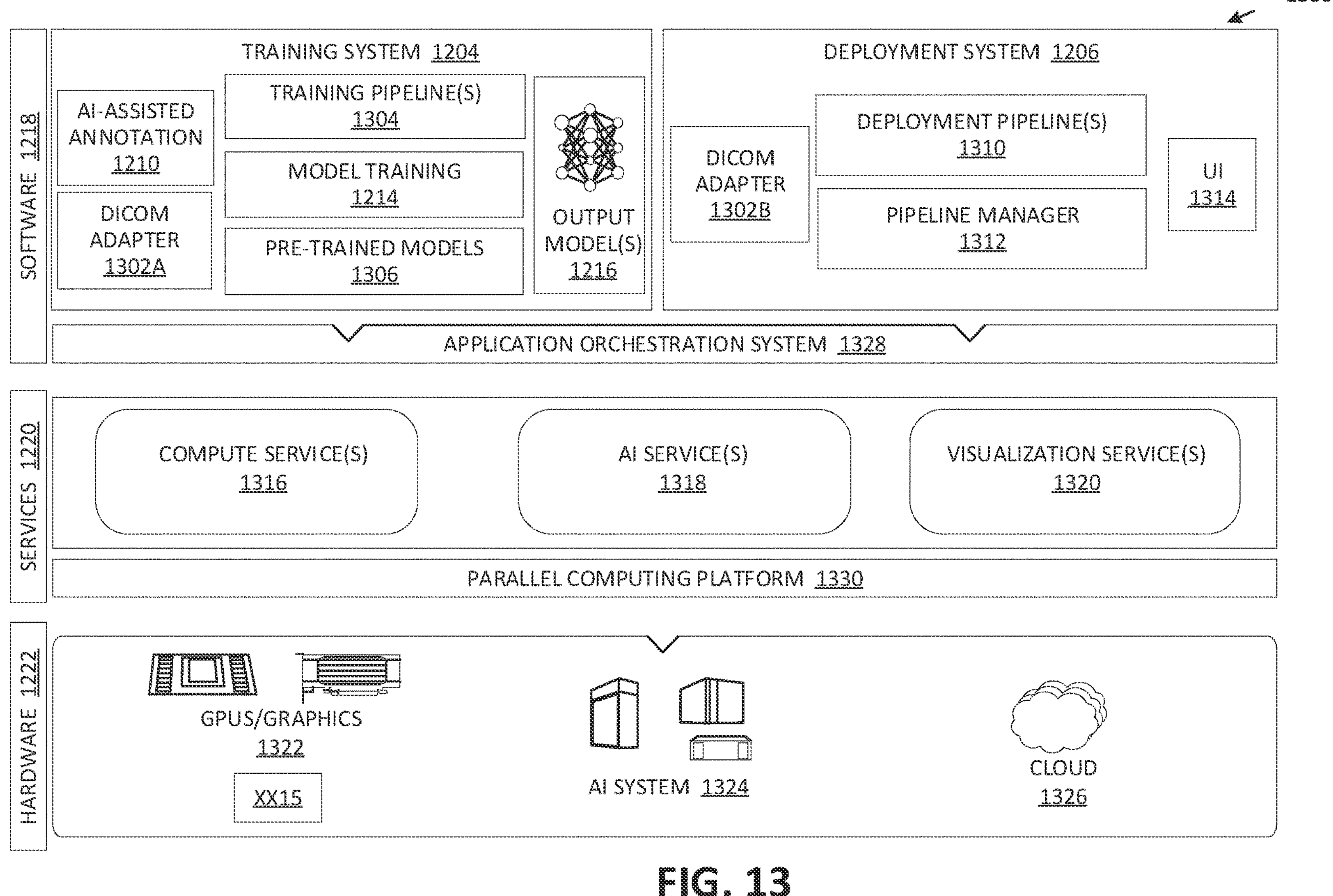
FIG. 13 is a system diagram for an example system for training, adapting, instantiating and deploying machine learning models in an advanced computing pipeline, in accordance with at least one embodiment.

FIG. 13 is a system diagram for an example system 1300 for generating and deploying an imaging deployment pipeline, in accordance with at least one embodiment. In at least one embodiment, system 1300 may be used to implement process 1200 of FIG. 12 and/or other processes including advanced processing and inferencing pipelines. In at least one embodiment, system 1300 may include training system 1204 and deployment system 1206. In at least one embodiment, training system 1204 and deployment system 1206 may be implemented using software 1218, services 1220, and/or hardware 1222, as described herein.

In at least one embodiment, system 1300 (e.g., training system 1204 and/or deployment system 1206) may implemented in a cloud computing environment (e.g., using cloud 1326). In at least one embodiment, system 1300 may be implemented locally with respect to a healthcare services facility, or as a combination of both cloud and local computing resources. In at least one embodiment, access to APIs in cloud 1326 may be restricted to authorized users through enacted security measures or protocols. In at least one embodiment, a security protocol may include web tokens that may be signed by an authentication (e.g., AuthN, AuthZ, Gluecon, etc.) service and may carry appropriate authorization. In at least one embodiment, APIs of virtual instruments (described herein), or other instantiations of system 1300, may be restricted to a set of public IPs that have been vetted or authorized for interaction.

In at least one embodiment, various components of system 1300 may communicate between and among one another using any of a variety of different network types, including but not limited to local area networks (LANs) and/or wide area networks (WANs) via wired and/or wireless communication protocols. In at least one embodiment, communication between facilities and components of system 1300 (e.g., for transmitting inference requests, for receiving results of inference requests, etc.) may be communicated over data bus(ses), wireless data protocols (Wi-Fi), wired data protocols (e.g., Ethernet), etc.

In at least one embodiment, training system 1204 may execute training pipelines 1304, similar to those described herein with respect to FIG. 12. In at least one embodiment, where one or more machine learning models are to be used in deployment pipelines 1310 by deployment system 1206, training pipelines 1304 may be used to train or retrain one or more (e.g., pre-trained) models, and/or implement one or more of pre-trained models 1306 (e.g., without a need for retraining or updating). In at least one embodiment, as a result of training pipelines 1304, output model(s) 1216 may be generated. In at least one embodiment, training pipelines 1304 may include any number of processing steps, such as but not limited to imaging data (or other input data) conversion or adaption In at least one embodiment, for different machine learning models used by deployment system 1206, different training pipelines 1304 may be used. In at least one embodiment, training pipeline 1304 similar to a first example described with respect to FIG. 12 may be used for a first machine learning model, training pipeline 1304 similar to a second example described with respect to FIG. 12 may be used for a second machine learning model, and training pipeline 1304 similar to a third example described with respect to FIG. 12 may be used for a third machine learning model. In at least one embodiment, any combination of tasks within training system 1204 may be used depending on what is required for each respective machine learning model. In at least one embodiment, one or more of machine learning models may already be trained and ready for deployment so machine learning models may not undergo any processing by training system 1204, and may be implemented by deployment system 1206.

In at least one embodiment, output model(s) 1216 and/or pre-trained model(s) 1306 may include any types of machine learning models depending on implementation or embodiment. In at least one embodiment, and without limitation, machine learning models used by system 1300 may include machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, Long/Short Term Memory (LSTM), Hopfield, Boltzmann, deep belief, deconvolutional, generative adversarial, liquid state machine, etc.), and/or other types of machine learning models.

In at least one embodiment, training pipelines 1304 may include AI-assisted annotation, as described in more detail herein with respect to at least FIG. 12B. In at least one embodiment, labeled data 1212 (e.g., traditional annotation) may be generated by any number of techniques. In at least one embodiment, labels or other annotations may be generated within a drawing program (e.g., an annotation program), a computer aided design (CAD) program, a labeling program, another type of program suitable for generating annotations or labels for ground truth, and/or may be hand drawn, in some examples. In at least one embodiment, ground truth data may be synthetically produced (e.g., generated from computer models or renderings), real produced (e.g., designed and produced from real-world data), machine-automated (e.g., using feature analysis and learning to extract features from data and then generate labels), human annotated (e.g., labeler, or annotation expert, defines location of labels), and/or a combination thereof. In at least one embodiment, for each instance of imaging data 1208 (or other data type used by machine learning models), there may be corresponding ground truth data generated by training system 1204. In at least one embodiment, AI-assisted annotation may be performed as part of deployment pipelines 1310; either in addition to, or in lieu of AI-assisted annotation included in training pipelines 1304. In at least one embodiment, system 1300 may include a multi-layer platform that may include a software layer (e.g., software 1218) of diagnostic applications (or other application types) that may perform one or more medical imaging and diagnostic functions. In at least one embodiment, system 1300 may be communicatively coupled to (e.g., via encrypted links) PACS server networks of one or more facilities. In at least one embodiment, system 1300 may be configured to access and referenced data from PACS servers to perform operations, such as training machine learning models, deploying machine learning models, image processing, inferencing, and/or other operations.

In at least one embodiment, a software layer may be implemented as a secure, encrypted, and/or authenticated API through which applications or containers may be invoked (e.g., called) from an external environment(s) (e.g., facility 1202). In at least one embodiment, applications may then call or execute one or more services 1220 for performing compute, AI, or visualization tasks associated with respective applications, and software 1218 and/or services 1220 may leverage hardware 1222 to perform processing tasks in an effective and efficient manner.

In at least one embodiment, deployment system 1206 may execute deployment pipelines 1310. In at least one embodiment, deployment pipelines 1310 may include any number of applications that may be sequentially, non-sequentially, or otherwise applied to imaging data (and/or other data types) generated by imaging devices, sequencing devices, genomics devices, etc.—including AI-assisted annotation, as described above. In at least one embodiment, as described herein, a deployment pipeline 1310 for an individual device may be referred to as a virtual instrument for a device (e.g., a virtual ultrasound instrument, a virtual CT scan instrument, a virtual sequencing instrument, etc.). In at least one embodiment, for a single device, there may be more than one deployment pipeline 1310 depending on information desired from data generated by a device. In at least one embodiment, where detections of anomalies are desired from an MRI machine, there may be a first deployment pipeline 1310, and where image enhancement is desired from output of an MRI machine, there may be a second deployment pipeline 1310.

In at least one embodiment, an image generation application may include a processing task that includes use of a machine learning model. In at least one embodiment, a user may desire to use their own machine learning model, or to select a machine learning model from model registry 1224. In at least one embodiment, a user may implement their own machine learning model or select a machine learning model for inclusion in an application for performing a processing task. In at least one embodiment, applications may be selectable and customizable, and by defining constructs of applications, deployment, and implementation of applications for a particular user are presented as a more seamless user experience. In at least one embodiment, by leveraging other features of system 1300—such as services 1220 and hardware 1222—deployment pipelines 1310 may be even more user friendly, provide for easier integration, and produce more accurate, efficient, and timely results. One or more embodiments of the application may be implemented as, or to include a game, a video streaming application, a machine control application, a machine locomotion application, a machine driving application, a synthetic data generation application, a model training application, a perception application, an augmented reality application, a virtual reality application, a mixed reality application, a robotics application, a security and surveillance application, an autonomous or semi-autonomous machine application, a deep learning application, an environment simulation application, a data center processing application, a conversational AI application, a light transport simulation application (e.g., ray tracing, path tracing, etc.), a collaborative content creation application for 3D assets, a digital twin system application, a cloud computing application and/or another type of application or service.

In at least one embodiment, deployment system 1206 may include a user interface 1314 (e.g., a graphical user interface, a web interface, etc.) that may be used to select applications for inclusion in deployment pipeline(s) 1310, arrange applications, modify, or change applications or parameters or constructs thereof, use and interact with deployment pipeline(s) 1310 during set-up and/or deployment, and/or to otherwise interact with deployment system 1206. In at least one embodiment, although not illustrated with respect to training system 1204, user interface 1314 (or a different user interface) may be used for selecting models for use in deployment system 1206, for selecting models for training, or retraining, in training system 1204, and/or for otherwise interacting with training system 1204.

In at least one embodiment, pipeline manager 1312 may be used, in addition to an application orchestration system 1328, to manage interaction between applications or containers of deployment pipeline(s) 1310 and services 1220 and/or hardware 1222. In at least one embodiment, pipeline manager 1312 may be configured to facilitate interactions from application to application, from application to service 1220, and/or from application or service to hardware 1222. In at least one embodiment, although illustrated as included in software 1218, this is not intended to be limiting, and in some examples (e.g., as illustrated in FIG. 11) pipeline manager 1312 may be included in services 1220. In at least one embodiment, application orchestration system 1328 (e.g., Kubernetes, DOCKER, etc.) may include a container orchestration system that may group applications into containers as logical units for coordination, management, scaling, and deployment. In at least one embodiment, by associating applications from deployment pipeline(s) 1310 (e.g., a reconstruction application, a segmentation application, etc.) with individual containers, each application may execute in a self-contained environment (e.g., at a kernel level) to increase speed and efficiency.

In at least one embodiment, each application and/or container (or image thereof) may be individually developed, modified, and deployed (e.g., a first user or developer may develop, modify, and deploy a first application and a second user or developer may develop, modify, and deploy a second application separate from a first user or developer), which may allow for focus on, and attention to, a task of a single application and/or container(s) without being hindered by tasks of another application(s) or container(s). In at least one embodiment, communication, and cooperation between different containers or applications may be aided by pipeline manager 1312 and application orchestration system 1328. In at least one embodiment, so long as an expected input and/or output of each container or application is known by a system (e.g., based on constructs of applications or containers), application orchestration system 1328 and/or pipeline manager 1312 may facilitate communication among and between, and sharing of resources among and between, each of applications or containers. In at least one embodiment, because one or more of applications or containers in deployment pipeline(s) 1310 may share same services and resources, application orchestration system 1328 may orchestrate, load balance, and determine sharing of services or resources between and among various applications or containers. In at least one embodiment, a scheduler may be used to track resource requirements of applications or containers, current usage or planned usage of these resources, and resource availability. In at least one embodiment, a scheduler may thus allocate resources to different applications and distribute resources between and among applications in view of requirements and availability of a system. In some examples, a scheduler (and/or other component of application orchestration system 1328) may determine resource availability and distribution based on constraints imposed on a system (e.g., user constraints), such as quality of service (QOS), urgency of need for data outputs (e.g., to determine whether to execute real-time processing or delayed processing), etc.

In at least one embodiment, services 1220 leveraged by and shared by applications or containers in deployment system 1206 may include compute services 1316, AI services 1318, visualization services 1320, and/or other service types. In at least one embodiment, applications may call (e.g., execute) one or more of services 1220 to perform processing operations for an application. In at least one embodiment, compute services 1316 may be leveraged by applications to perform super-computing or other high-performance computing (HPC) tasks. In at least one embodiment, compute service(s) 1316 may be leveraged to perform parallel processing (e.g., using a parallel computing platform 1330) for processing data through one or more of applications and/or one or more tasks of a single application, substantially simultaneously. In at least one embodiment, parallel computing platform 1330 (e.g., NVIDIA's CUDA) may enable general purpose computing on GPUs (GPGPU) (e.g., GPUs 1322). In at least one embodiment, a software layer of parallel computing platform 1330 may provide access to virtual instruction sets and parallel computational elements of GPUs, for execution of compute kernels. In at least one embodiment, parallel computing platform 1330 may include memory and, in some embodiments, a memory may be shared between and among multiple containers, and/or between and among different processing tasks within a single container. In at least one embodiment, inter-process communication (IPC) calls may be generated for multiple containers and/or for multiple processes within a container to use same data from a shared segment of memory of parallel computing platform 1330 (e.g., where multiple different stages of an application or multiple applications are processing same information). In at least one embodiment, rather than making a copy of data and moving data to different locations in memory (e.g., a read/write operation), same data in same location of a memory may be used for any number of processing tasks (e.g., at a same time, at different times, etc.). In at least one embodiment, as data is used to generate new data as a result of processing, this information of a new location of data may be stored and shared between various applications. In at least one embodiment, location of data and a location of updated or modified data may be part of a definition of how a payload is understood within containers.

In at least one embodiment, AI services 1318 may be leveraged to perform inferencing services for executing machine learning model(s) associated with applications (e.g., tasked with performing one or more processing tasks of an application). In at least one embodiment, AI services 1318 may leverage AI system 1324 to execute machine learning model(s) (e.g., neural networks, such as CNNs) for segmentation, reconstruction, object detection, feature detection, classification, and/or other inferencing tasks. In at least one embodiment, applications of deployment pipeline(s) 1310 may use one or more of output models 1216 from training system 1204 and/or other models of applications to perform inference on imaging data. In at least one embodiment, two or more examples of inferencing using application orchestration system 1328 (e.g., a scheduler) may be available. In at least one embodiment, a first category may include a high priority/low latency path that may achieve higher service level agreements, such as for performing inference on urgent requests during an emergency, or for a radiologist during diagnosis. In at least one embodiment, a second category may include a standard priority path that may be used for requests that may be non-urgent or where analysis may be performed at a later time. In at least one embodiment, application orchestration system 1328 may distribute resources (e.g., services 1220 and/or hardware 1222) based on priority paths for different inferencing tasks of AI services 1318.

In at least one embodiment, shared storage may be mounted to AI services 1318 within system 1300. In at least one embodiment, shared storage may operate as a cache (or other storage device type) and may be used to process inference requests from applications. In at least one embodiment, when an inference request is submitted, a request may be received by a set of API instances of deployment system 1206, and one or more instances may be selected (e.g., for best fit, for load balancing, etc.) to process a request. In at least one embodiment, to process a request, a request may be entered into a database, a machine learning model may be located from model registry 1224 if not already in a cache, a validation step may ensure appropriate machine learning model is loaded into a cache (e.g., shared storage), and/or a copy of a model may be saved to a cache. In at least one embodiment, a scheduler (e.g., of pipeline manager 1312) may be used to launch an application that is referenced in a request if an application is not already running or if there are not enough instances of an application. In at least one embodiment, if an inference server is not already launched to execute a model, an inference server may be launched. Any number of inference servers may be launched per model. In at least one embodiment, in a pull model, in which inference servers are clustered, models may be cached whenever load balancing is advantageous. In at least one embodiment, inference servers may be statically loaded in corresponding, distributed servers.

In at least one embodiment, inferencing may be performed using an inference server that runs in a container. In at least one embodiment, an instance of an inference server may be associated with a model (and optionally a plurality of versions of a model). In at least one embodiment, if an instance of an inference server does not exist when a request to perform inference on a model is received, a new instance may be loaded. In at least one embodiment, when starting an inference server, a model may be passed to an inference server such that a same container may be used to serve different models so long as inference server is running as a different instance.

In at least one embodiment, during application execution, an inference request for a given application may be received, and a container (e.g., hosting an instance of an inference server) may be loaded (if not already), and a start procedure may be called. In at least one embodiment, pre-processing logic in a container may load, decode, and/or perform any additional pre-processing on incoming data (e.g., using a CPU(s) and/or GPU(s) and/or DPU(s)). In at least one embodiment, once data is prepared for inference, a container may perform inference as necessary on data. In at least one embodiment, this may include a single inference call on one image (e.g., a hand X-ray), or may require inference on hundreds of images (e.g., a chest CT). In at least one embodiment, an application may summarize results before completing, which may include, without limitation, a single confidence score, pixel level-segmentation, voxel-level segmentation, generating a visualization, or generating text to summarize findings. In at least one embodiment, different models or applications may be assigned different priorities. For example, some models may have a real-time (TAT<1 min) priority while others may have lower priority (e.g., TAT<12 min). In at least one embodiment, model execution times may be measured from requesting institution or entity and may include partner network traversal time, as well as execution on an inference service.

In at least one embodiment, transfer of requests between services 1220 and inference applications may be hidden behind a software development kit (SDK), and robust transport may be provided through a queue. In at least one embodiment, a request will be placed in a queue via an API for an individual application/tenant ID combination and an SDK will pull a request from a queue and give a request to an application. In at least one embodiment, a name of a queue may be provided in an environment from where an SDK will pick it up. In at least one embodiment, asynchronous communication through a queue may be useful as it may allow any instance of an application to pick up work as it becomes available. Results may be transferred back through a queue, to ensure no data is lost. In at least one embodiment, queues may also provide an ability to segment work, as highest priority work may go to a queue with most instances of an application connected to it, while lowest priority work may go to a queue with a single instance connected to it that processes tasks in an order received. In at least one embodiment, an application may run on a GPU-accelerated instance generated in cloud 1326, and an inference service may perform inferencing on a GPU.

In at least one embodiment, visualization services 1320 may be leveraged to generate visualizations for viewing outputs of applications and/or deployment pipeline(s) 1310. In at least one embodiment, GPUs 1322 may be leveraged by visualization services 1320 to generate visualizations. In at least one embodiment, rendering effects, such as ray-tracing, may be implemented by visualization services 1320 to generate higher quality visualizations. In at least one embodiment, visualizations may include, without limitation, 2D image renderings, 3D volume renderings, 3D volume reconstruction, 2D tomographic slices, virtual reality displays, augmented reality displays, etc. In at least one embodiment, virtualized environments may be used to generate a virtual interactive display or environment (e.g., a virtual environment) for interaction by users of a system (e.g., doctors, nurses, radiologists, etc.). In at least one embodiment, visualization services 1320 may include an internal visualizer, cinematics, and/or other rendering or image processing capabilities or functionality (e.g., ray tracing, rasterization, internal optics, etc.).

In at least one embodiment, hardware 1222 may include GPUs 1322, AI system 1324, cloud 1326, and/or any other hardware used for executing training system 1204 and/or deployment system 1606. In at least one embodiment, GPUs 1322 (e.g., NVIDIA's TESLA and/or QUADRO GPUs) may include any number of GPUs that may be used for executing processing tasks of compute services 1316, AI services 1318, visualization services 1320, other services, and/or any of features or functionality of software 1218. For example, with respect to AI services 1318, GPUs 1322 may be used to perform pre-processing on imaging data (or other data types used by machine learning models), post-processing on outputs of machine learning models, and/or to perform inferencing (e.g., to execute machine learning models). In at least one embodiment, cloud 1326, AI system 1324, and/or other components of system 1300 may use GPUs 1322. In at least one embodiment, cloud 1326 may include a GPU-optimized platform for deep learning tasks. In at least one embodiment, AI system 1324 may use GPUs, and cloud 1326—or at least a portion tasked with deep learning or inferencing—may be executed using one or more AI systems 1324. As such, although hardware 1222 is illustrated as discrete components, this is not intended to be limiting, and any components of hardware 1222 may be combined with, or leveraged by, any other components of hardware 1222.

In at least one embodiment, AI system 1324 may include a purpose-built computing system (e.g., a super-computer or an HPC) configured for inferencing, deep learning, machine learning, and/or other artificial intelligence tasks. In at least one embodiment, AI system 1324 (e.g., NVIDIA's DGX) may include GPU-optimized software (e.g., a software stack) that may be executed using a plurality of GPUs 1322, in addition to DPUs, CPUs, RAM, storage, and/or other components, features, or functionality. In at least one embodiment, one or more AI systems 1324 may be implemented in cloud 1326 (e.g., in a data center) for performing some or all of AI-based processing tasks of system 1300.

In at least one embodiment, cloud 1326 may include a GPU-accelerated infrastructure (e.g., NVIDIA's NGC) that may provide a GPU-optimized platform for executing processing tasks of system 1300. In at least one embodiment, cloud 1326 may include an AI system(s) 1324 for performing one or more of AI-based tasks of system 1300 (e.g., as a hardware abstraction and scaling platform). In at least one embodiment, cloud 1326 may integrate with application orchestration system 1328 leveraging multiple GPUs to enable seamless scaling and load balancing between and among applications and services 1220. In at least one embodiment, cloud 1326 may tasked with executing at least some of services 1220 of system 1300, including compute services 1316, AI services 1318, and/or visualization services 1320, as described herein. In at least one embodiment, cloud 1326 may perform small and large batch inference (e.g., executing NVIDIA's TENSOR RT), provide an accelerated parallel computing API and platform 1330 (e.g., NVIDIA's CUDA), execute application orchestration system 1328 (e.g., KUBERNETES), provide a graphics rendering API and platform (e.g., for ray-tracing, 2D graphics, 3D graphics, and/or other rendering techniques to produce higher quality cinematics), and/or may provide other functionality for system 1300.

Figure 14A:
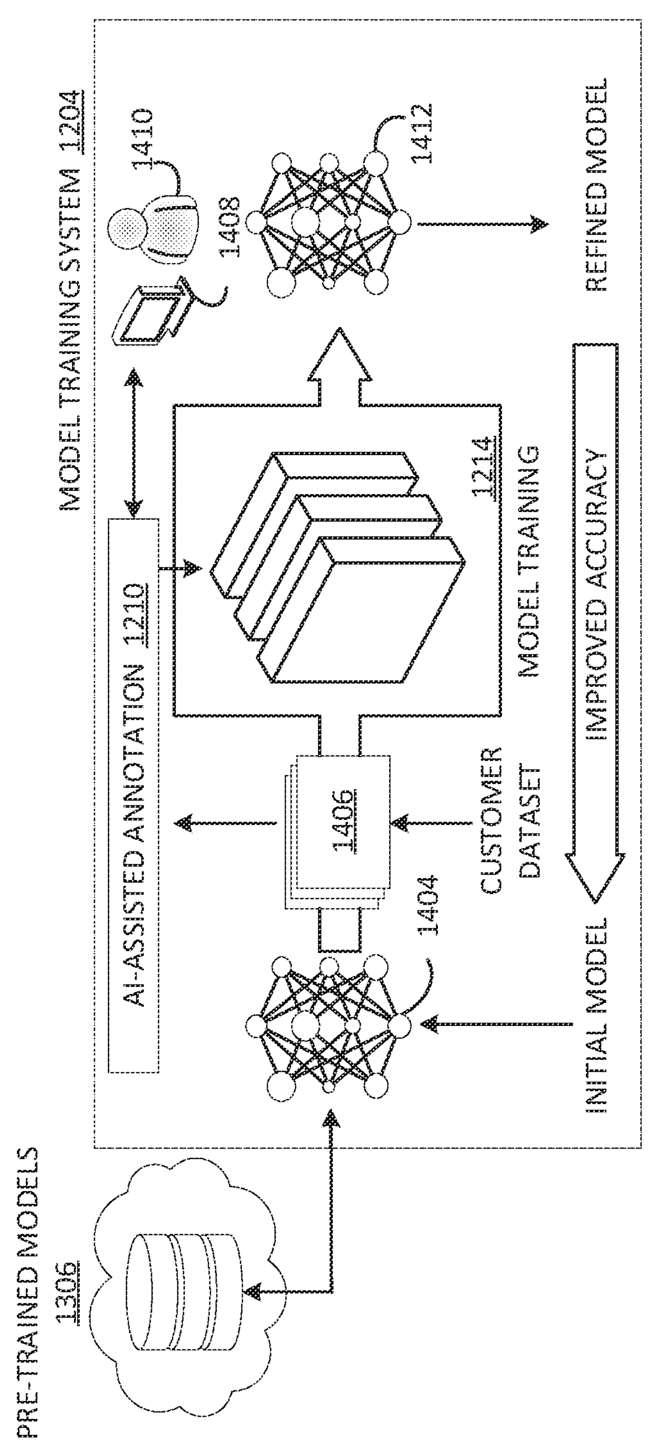

FIG. 14A illustrates a data flow diagram for a process 1400 to train, retrain, or update a machine learning model, in accordance with at least one embodiment. In at least one embodiment, process 1400 may be executed using, as a non-limiting example, system 1300 of FIG. 13. In at least one embodiment, process 1400 may leverage services 1220 and/or hardware 1222 of system 1300, as described herein. In at least one embodiment, refined models 1412 generated by process 1400 may be executed by deployment system 1206 for one or more containerized applications in deployment pipelines 1310.

In at least one embodiment, model training 1214 may include retraining or updating an initial model 1404 (e.g., a pre-trained model) using new training data (e.g., new input data, such as customer dataset 1406, and/or new ground truth data associated with input data). In at least one embodiment, to retrain, or update, initial model 1404, output or loss layer(s) of initial model 1404 may be reset, or deleted, and/or replaced with an updated or new output or loss layer(s). In at least one embodiment, initial model 1404 may have previously fine-tuned parameters (e.g., weights and/or biases) that remain from prior training, so training or retraining 1214 may not take as long or require as much processing as training a model from scratch. In at least one embodiment, during model training 1214, by having reset or replaced output or loss layer(s) of initial model 1404, parameters may be updated and re-tuned for a new data set based on loss calculations associated with accuracy of output or loss layer(s) at generating predictions on new, customer dataset 1406 (e.g., image data 1208 of FIG. 12).

In at least one embodiment, pre-trained models 1306 may be stored in a data store, or registry (e.g., model registry 1224 of FIG. 12). In at least one embodiment, pre-trained models 1306 may have been trained, at least in part, at one or more facilities other than a facility executing process 1400. In at least one embodiment, to protect privacy and rights of patients, subjects, or clients of different facilities, pre-trained models 1306 may have been trained, on-premise, using customer or patient data generated on-premise. In at least one embodiment, pre-trained models 1306 may be trained using cloud 1326 and/or other hardware 1222, but confidential, privacy protected patient data may not be transferred to, used by, or accessible to any components of cloud 1326 (or other off premise hardware). In at least one embodiment, where a pre-trained model 1306 is trained at using patient data from more than one facility, pre-trained model 1306 may have been individually trained for each facility prior to being trained on patient or customer data from another facility. In at least one embodiment, such as where a customer or patient data has been released of privacy concerns (e.g., by waiver, for experimental use, etc.), or where a customer or patient data is included in a public data set, a customer or patient data from any number of facilities may be used to train pre-trained model 1306 on-premise and/or off premise, such as in a datacenter or other cloud computing infrastructure.

In at least one embodiment, when selecting applications for use in deployment pipelines 1310, a user may also select machine learning models to be used for specific applications. In at least one embodiment, a user may not have a model for use, so a user may select a pre-trained model 1306 to use with an application. In at least one embodiment, pre-trained model 1306 may not be optimized for generating accurate results on customer dataset 1406 of a facility of a user (e.g., based on patient diversity, demographics, types of medical imaging devices used, etc.). In at least one embodiment, prior to deploying pre-trained model 1306 into deployment pipeline 1310 for use with an application(s), pre-trained model 1306 may be updated, retrained, and/or fine-tuned for use at a respective facility.

In at least one embodiment, a user may select pre-trained model 1306 that is to be updated, retrained, and/or fine-tuned, and pre-trained model 1306 may be referred to as initial model 1404 for training system 1204 within process 1400. In at least one embodiment, customer dataset 1406 (e.g., imaging data, genomics data, sequencing data, or other data types generated by devices at a facility) may be used to perform model training 1214 (which may include, without limitation, transfer learning) on initial model 1404 to generate refined model 1412. In at least one embodiment, ground truth data corresponding to customer dataset 1406 may be generated by training system 1204. In at least one embodiment, ground truth data may be generated, at least in part, by clinicians, scientists, doctors, practitioners, at a facility (e.g., as labeled clinic data 1212 of FIG. 12).

In at least one embodiment, AI-assisted annotation 1210 may be used in some examples to generate ground truth data. In at least one embodiment, AI-assisted annotation 1210 (e.g., implemented using an AI-assisted annotation SDK) may leverage machine learning models (e.g., neural networks) to generate suggested or predicted ground truth data for a customer dataset. In at least one embodiment, user 1410 may use annotation tools within a user interface (a graphical user interface (GUI)) on computing device 1408.

In at least one embodiment, user 1410 may interact with a GUI via computing device 1408 to edit or fine-tune (auto)annotations. In at least one embodiment, a polygon editing feature may be used to move vertices of a polygon to more accurate or fine-tuned locations.

In at least one embodiment, once customer dataset 1406 has associated ground truth data, ground truth data (e.g., from AI-assisted annotation, manual labeling, etc.) may be used by during model training 1214 to generate refined model 1412. In at least one embodiment, customer dataset 1406 may be applied to initial model 1404 any number of times, and ground truth data may be used to update parameters of initial model 1404 until an acceptable level of accuracy is attained for refined model 1412. In at least one embodiment, once refined model 1412 is generated, refined model 1412 may be deployed within one or more deployment pipelines 1210 at a facility for performing one or more processing tasks with respect to medical imaging data.

In at least one embodiment, refined model 1412 may be uploaded to pre-trained models 1206 in model registry 1224 to be selected by another facility. In at least one embodiment, his process may be completed at any number of facilities such that refined model 1412 may be further refined on new datasets any number of times to generate a more universal model.

FIG. 14B is an example illustration of a client-server architecture 1432 to enhance annotation tools with pre-trained annotation models, in accordance with at least one embodiment. In at least one embodiment, AI-assisted annotation tools 1436 may be instantiated based on a client-server architecture 1432. In at least one embodiment, annotation tools 1436 in imaging applications may aid radiologists, for example, identify organs and abnormalities. In at least one embodiment, imaging applications may include software tools that help user 1410 to identify, as a non-limiting example, a few extreme points on a particular organ of interest in raw images 1434 (e.g., in a 3D MRI or CT scan) and receive auto-annotated results for all 2D slices of a particular organ. In at least one embodiment, results may be stored in a data store as training data 1438 and used as (for example and without limitation) ground truth data for training. In at least one embodiment, when computing device 1408 sends extreme points for AI-assisted annotation 1210, a deep learning model, for example, may receive this data as input and return inference results of a segmented organ or abnormality. In at least one embodiment, pre-instantiated annotation tools, such as AI-Assisted Annotation Tool 1436B in FIG. 14B, may be enhanced by making API calls (e.g., API Call 1444) to a server, such as an Annotation Assistant Server 1440 that may include a set of pre-trained models 1442 stored in an annotation model registry, for example. In at least one embodiment, an annotation model registry may store pre-trained models 1442 (e.g., machine learning models, such as deep learning models) that are pre-trained to perform AI-assisted annotation on a particular organ or abnormality. These models may be further updated by using training pipelines 1304. In at least one embodiment, pre-installed annotation tools may be improved over time as new labeled clinic data 1212 is added.

Such components may be used to generate synthetic data imitating failure cases in a network training process, which may help to improve performance of the network while limiting the amount of synthetic data to avoid overfitting.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit the disclosure to a specific form or forms disclosed, but on the contrary, the intention is to cover all modifications, alternative constructions, and equivalents falling within the spirit and scope of the disclosure, as defined in appended claims.

Use of terms "a" and "an" and "the" and similar referents in the context of describing disclosed embodiments (especially in the context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitations of ranges of values herein are merely intended to serve as a shorthand method of referring individually to each separate value falling within the range, unless otherwise indicated herein, and each separate value is incorporated into the specification as if it were individually recited herein. In at least one embodiment, the use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but subset and corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in an illustrative example of a set having three members, conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). In at least one embodiment, the number of items in a plurality is at least two, but can be more when so indicated either explicitly or by context. Further, unless stated otherwise or otherwise clear from context, the phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in the form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause a computer system to perform operations described herein. In at least one embodiment, a set of non-transitory computer-readable storage media comprises multiple non-transitory computer-readable storage media and one or more of individual non-transitory storage media of multiple non-transitory computer-readable storage media lack all of the code while multiple non-transitory computer-readable storage media collectively store all of the code. In at least one embodiment, executable instructions are executed such that different instructions are executed by different processors.

Accordingly, in at least one embodiment, computer systems are configured to implement one or more services that singly or collectively perform operations of processes described herein and such computer systems are configured with applicable hardware and/or software that enable the performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

All references, including publications, patent applications, and patents, cited herein are hereby incorporated by reference to the same extent as if each reference were individually and specifically indicated to be incorporated by reference and were set forth in its entirety herein.

In description and claims, terms "coupled" and "connected," along with their derivatives, may be used. It should be understood that these terms may not be intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, the term "processor" may refer to any device or portion of a device that processes electronic data from registers and/or memory and transform that electronic data into other electronic data that may be stored in registers and/or memory. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, terms "system" and "method" are used herein interchangeably insofar as the system may embody one or more methods and methods may be considered a system.

In the present document, references may be made to obtaining, acquiring, receiving, or inputting analog or digital data into a subsystem, computer system, or computer-implemented machine. In at least one embodiment, the process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or inter-process communication mechanism.

Although descriptions herein set forth example embodiments of described techniques, other architectures may be used to implement described functionality, and are intended to be within the scope of this disclosure. Furthermore, although specific distributions of responsibilities may be defined above for purposes of description, various functions and responsibilities might be distributed and divided in different ways, depending on circumstances.

Furthermore, although the subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A method comprising:

identifying usage data associated with an application that is to be executed using a computing system, wherein the computing system comprises an integrated processing unit and a discrete processing unit;

processing the usage data using a machine learning model to generate (i) a first value of at least one of one or more system performance metrics or one or more resource utilization metrics corresponding to execution of the one or more operations using the integrated processing unit and (ii) a second value of the at least one of the one or more system performance metrics or the one or more resource utilization metrics corresponding to execution of the one or more operations using the discrete processing unit;

determining whether the one or more operations satisfy at least one of a processing cycle criterion or a power consumption criterion based on the first value and the second value; and based on the determination, routing the one or more operations of the application to the integrated processing unit or the discrete processing unit.

2. The method of claim 1, wherein the machine learning model is trained to generate the first value and the second value based on learned relationships between usage data and execution characteristics of the integrated processing unit and the discrete processing unit.

3. The method of claim 2, wherein the machine learning model is further trained to generate the first value and the second value based on given context data associated with the computing system, the context data comprising at least one of a first pipeline state of the integrated processing unit, a second pipeline state of the discrete processing unit, a first hardware state of the integrated processing unit, a second hardware state of the discrete processing unit, or a driver state of the computing system.

4. The method of claim 3, further comprising:

identifying context data associated with the system; and providing context data associated with the system as input to the machine learning model.

5. The method of claim 1, wherein the one or more operations of the application are routed to the integrated processing unit responsive to a determination that the first value further satisfies one or more application processing criteria.

6. The method of claim 1, wherein the one or more operations of the application are routed to the discrete processing unit responsive to at least one of a determination that the first value does not satisfy the one or more application processing criteria or a determination that the second value does satisfy the one or more application processing criteria.

7. The method of claim 5, wherein the first value satisfies the one or more application processing criteria responsive to the first value exceeding a performance metric threshold.

8. The method of claim 1, wherein the identified usage data comprises historical telemetry data associated with previously executing the application or another application executing using the integrated processing unit or the discrete processing unit of the computing system.

9. The method of claim 1, wherein identifying the usage data associated with the application comprises:

responsive to receiving a request to execute the application using the computing system, providing, via a graphical user interface for a client device, an inquiry of one or more features of the application that are to be accessed by a user while the application executes; and determining the usage data associated with the application in view of a response to the provided inquiry.

10. The method of claim 1, wherein at least one of the first value or the second value further comprise one or more user experience metric values associated with executing the application using the at least one of the integrated processing unit or the discrete processing unit.

11. A processor comprising:

one or more processing units to identify usage data associated with an application that is to be executed using a computing system comprising an integrated processing unit and a discrete processing unit, to process the usage data using a machine learning model to generate (i) a first value of at least one of the one or more system performance metrics or one or more resource utilization metrics corresponding to execution of one or more operations of the application using the integrated processing unit, and (ii) a second value of the at least one of the one or more system performance metrics or the one or more resource utilization metrics corresponding to execution of the one or more operations using the discrete processing unit, to determine whether one or more operations of the application satisfy at least one of a processing cycle criterion or a power consumption criterion based on the first value and the second value, and, based on the determination, to route the one or more operations of the application to the integrated processing unit or the discrete processing unit.

12. The processor of claim 11, wherein the machine learning model is trained to generate the first value and the second value based on learned relationships between usage data and execution characteristics of the integrated processing unit and the discrete processing unit.

13. The processor of claim 4, wherein the one or more operations of the application are routed to the integrated processing unit responsive to a determination that the first value further satisfies one or more application processing criteria.

14. The processor of claim 4, wherein the processor is comprised in at least one of:

a control system for an autonomous or semi-autonomous machine;

a perception system for an autonomous or semi-autonomous machine;

a system for performing simulation operations;

a system for performing digital twin operations;

a system for performing light transport simulation;

a system for performing collaborative content creation for 3D assets;

a system for performing deep learning operations;

a system implemented using an edge device;

a system implemented using a robot;

a system for performing conversational AI operations;

a system for generating synthetic data;

a system for presenting at least one of virtual reality content, augmented reality content, or mixed reality content;

a system implemented at least partially in a data center; or a system implemented at least partially using cloud computing resources.

15. A system comprising:

a processing device to perform operations comprising:

identifying usage data associated with an application that is to be executed using a computing system, wherein the computing system comprises an integrated processing unit and a discrete processing unit;

processing the usage data using a machine learning model to generate (i) a first value of at least one of one or more system performance metrics or one or more resource utilization metrics corresponding to execution of one or more operations of the application using the integrated processing unit and (ii) a second value of the at least one of the one or more system performance metrics or the one or more resource utilization metrics corresponding to execution of the one or more operations using the discrete processing unit;

determining whether one or more operations of the application satisfy at least one of a processing cycle criterion or a power consumption criterion based on the first value and the second value; and based on the determination, routing the one or more operations of the application to the integrated processing unit or the discrete processing unit.

16. The system of claim 15, wherein the machine learning model is trained to generate the first value and the second value based on learned relationships between usage data and execution characteristics of the integrated processing unit and the discrete processing unit.

17. The system of claim 16, wherein the machine learning model is further trained to generate the first value and the second value based on given context data associated with the computing system, the context data comprising at least one of a first pipeline state of the integrated processing unit, a second pipeline state of the discrete processing unit, a first hardware state of the integrated processing unit, a second hardware state of the discrete processing unit, or a driver state of the computing system.

18. The system of claim 15, wherein the one or more operations of the application are routed to the integrated processing unit responsive to a determination that the first value further satisfies one or more application processing criteria.

19. The system of claim 18, wherein the one or more operations of the application are routed to the discrete processing unit responsive to at least one of a determination that the first value does not satisfy the one or more application processing criteria or a determination that the second value does satisfy the one or more application processing criteria.

20. The system of claim 18, wherein the first value satisfies the one or more application processing criteria responsive to the first value exceeding a performance metric threshold.

* * * * *